United States Patent [19]
Doi et al.

[11] Patent Number: 5,668,888
[45] Date of Patent: Sep. 16, 1997

[54] METHOD AND SYSTEM FOR AUTOMATIC DETECTION OF RIBS AND PNEUMOTHORAX IN DIGITAL CHEST RADIOGRAPHS

[75] Inventors: Kunio Doi, Willowbrook, Ill.; Shigeru Sanada, Iwade-machi, Japan

[73] Assignee: Arch Development Corporation, Chicago, Ill.

[21] Appl. No.: 174,175

[22] Filed: Dec. 29, 1993

Related U.S. Application Data

[63] Continuation of Ser. No. 617,080, Nov. 21, 1990, abandoned.

[51] Int. Cl.$^6$ ........................................... G06G 7/60
[52] U.S. Cl. ............................... 382/132; 382/199
[58] Field of Search .................... 364/413.13; 382/6, 382/9, 16, 18, 22, 54, 132, 199

[56] References Cited

U.S. PATENT DOCUMENTS

| | | | |
|---|---|---|---|
| 4,101,961 | 7/1978 | Reiber | 364/413.02 |
| 4,538,227 | 8/1985 | Toraichi et al. | 364/413.22 |
| 4,637,400 | 1/1987 | Marcus | 128/653.1 |
| 4,729,019 | 3/1988 | Rouvrais | 358/112 |
| 4,751,643 | 6/1988 | Lorensen et al. | 364/413 |
| 4,843,630 | 6/1989 | Catros et al. | 382/6 |
| 4,851,984 | 7/1989 | Doi et al. | 364/413.23 |
| 4,926,492 | 5/1990 | Tanaka et al. | 382/18 |
| 4,974,077 | 11/1990 | Kusaba | 358/101 |
| 5,123,054 | 6/1992 | Hara et al. | 382/6 |

OTHER PUBLICATIONS

Proceedings of the SPIE—International Society for Optical Eng., vol. 1002, pp. 158–167, 1989, Gregson et al., "A symmetry-insensitive edge enhancement filter . . . ", (abstract only).

Proceedings of the SPIE—International Society for Optical Eng., vol. 1660, pp. 446–454, 1992, Kogelmeyer et al., "Computer Detection of Stellate Lessions in Mamograms" (abstract only).

*Computer Vision*, Ballard et al., Prentice-Hall, Inc., New Jersey, 1982, pp. 63–148.

*Med. Phys.*, issue 19/5, 1992, Sanada et al., "Image Feature Analysis and Computer-aided Diagnosis in Digital Radiography: Automated Detection of Pneumothorax in Chest Images", pp. 1153–1160 (abstract only provided).

(List continued on next page.)

*Primary Examiner*—Robert A. Weinhardt
*Assistant Examiner*—Joseph Thomas
*Attorney, Agent, or Firm*—Oblon, Spivak, McClelland, Maier & Neustadt, P.C.

[57] ABSTRACT

A method and system for the detection of anatomical features in a digital chest radiograph, and in particular rib edges and pneumothorax, wherein vertical profiles are defined in regions of the lungs in the radiograph, and a model function is fitted to the profiles to obtain initial estimates of the locations of rib edges. Gradient-histogram analysis is performed by determining edge gradient and their corresponding orientations in regions of interest (ROIs) defined in the radiograph in the vicinity of the initially estimated rib edges, determining the maximum edge gradient in each of the ROIs, and forming histograms which define accurate detections of rib edges. The edges are fitted with an elliptical function and a representation of the entire rib cage structure is obtained. The method and system are also applied to the detection of pneumothorax where ROIs are defined in the apical lung region and edge gradients and their orientations are detected in the ROIs. The ROI is edge-enhanced using the edge gradients and their orientations and previously detected rib edges are removed. Subtle, curved-line structure corresponding to pneumothorax in the edge-enhanced ROI are detected and a representation of the pneumothorax is obtained using a Hough transform.

33 Claims, 28 Drawing Sheets

OTHER PUBLICATIONS

*Digital Image Processing*, 2$^{nd}$ Edition, Addison–Wesley Pub. Co., 1987, Gonzalez et al., pp. 331–390.

*Radiology*, Apr. 1988, Goodman et al., "Pneumothorax and other Lung Diseases Effect of Altered Resolution and Edge Enhancement on Diagnosis with Digitized Radiographs", pp. 83–88.

Proceedings of ISM III '82, CH1804–4/82/0000/0114, 1982, Cocklin et al., "Digital Enhancement of Pneumothoraces" pp. 114–116 (abstract only).

METHOD AND SYSTEM FOR AUTOMATIC DETECTION OF RIBS AND PNEUMOTHORAX IN DIGITAL CHEST RADIOGRAPHS

This application is a Continuation of application Ser. No. 07/617,080, filed on Nov. 21, 1990, now abandoned.

The U.S. Government has a paid-up license in this invention and the right in limited circumstances to require the patent owner to license others on reasonable terms as provided for by the terms of the contracts nos. USPHS CA 24806, USPHS CA 47043, and USPHS CA 41851 awarded by the National Institute of Health.

CROSS-REFERENCE TO RELATED APPLICATIONS

The present invention is related to commonly-owned U.S. Pat. No. 4,851,984 and application Ser. No. 07/275,720, filed Nov. 23, 1988, now U.S. Pat. No. 5,072,384, the disclosures of which are incorporated herein by reference.

BACKGROUND OF THE INVENTION

1. Field of the Invention

The present invention relates to the computerized quantitative analysis of digital chest radiographs, and in particular to a method and system for detection of posterior ribs and pneumothorax in digital chest radiographs.

2. Discussion of the Background

It is commonly believed that the rib structure in chest radiographs provides a frame of reference for quantitative analysis of digital chest images, such as the analysis of temporal changes between successive digital chest images. For example, in the case of a lung cancer that develops during the interval between two chest X-ray examinations, a temporal subtraction technique has been used to improve detectability, provided that the rib structures in the two images may be matched by converting the locations of ribs in one image to those of another, as suggested by Kinsey et al "Application of Digital Image Change Detection to Diagnosis and Follow-up of Cancer Involving Lungs," Proceedings of SPIE 70, 99–112 (1975).

It has also been shown that many false-positives occur at ribs and rib crossings in computerized detection of lung nodules in a single frontal chest radiograph. M. L. Giger et al "Pulmonary Nodules: Computer-Aided Detection in Digital Chest Images," RadioGraphics 10, 41–51 (1990), and Yoshimura et al "Analysis of Computer-Reported False-Positive Detections of Lung Nodules in Digital Chest Radiography," Med. Phys. 17, 524 (P) (1990). For quantitative analysis of lung textures related to interstitial diseases, many regions-of-interest (ROIs) need to be selected automatically in the intercostal spaces. Thus, accurate knowledge of rib locations is essential for the development of a reliable method for automated selection of ROIs.

In the prior art, various methods have been developed for automated rib detection. Generally, these methods have attempted to detect local rib edges while applying some anatomic knowledge to construct the rib structure. However, these methods are still far from being ready for practical use on clinical chest images, and some difficulties in automated rib detection remain. For example, chest images contain radiographic noise and also many confusing edges due to blood vessels, bronchi, lung texture, lesions and artifacts. In addition, rib contrast is commonly low, and rib edges are often ill-defined because of poor image quality. Accordingly, the signal-to-noise ratio of rib structures is generally low.

Similarly, accurate knowledge of rib locations is useful for development of automated techniques for the detection of pneumothorax. Pneumothorax is a condition caused by an accumulation of air or gas in the pleural cavity, which occurs as a result of disease or injury. Radiographic detection of pneumothorax is commonly based on a subtle, fine curved-line pattern in the apical lung region, a dark pleural air space against the chest wall due to increased transparency, and a lack of lung structure between the rib cage and the pneumothorax pattern. Although pneumothoraces are clinically important abnormalities, it is difficult to detect them, in part because there is overlap between the pneumothoraces and the ribs and clavicle. Prior art techniques have been used to enhance the pneumothorax pattern by use of digital processing of chest images. However, no attempt has been made to detect pneumothorax automatically by means of a computer. Computerized, automated detection of subtle pneumothorax patterns would be helpful for the diagnosis made by radiologists in that they will be alerted to a potential subtle lesion.

SUMMARY OF THE INVENTION

Accordingly, one object of this present invention is to provide a novel method and system using edge gradients and their orientations determined from a digital chest radiograph to automatically detect edge structure of anatomic features in the radiograph.

Another object of the present invention is to employ statistical analysis of edge gradients and their orientations in a digital chest radiograph for automatic delineation of posterior rib edges and the subtle curved-line pattern of pneumothorax in the apical lung region.

These and other objects of the present invention are obtained by a method and system for detecting anatomic features in a digital chest radiograph automatically, in which ROIs are defined in the digital chest radiograph in areas containing edge structure desired to be detected and edge gradients and their corresponding orientations are obtained using a Sobel operator for a plurality of pixels included in each ROI. The maximum of the edge gradients in each ROI is determined and used to produce a representation of the anatomic feature. Typically, according to the invention, the maximum edge gradients are summed to form cumulative maximum edge gradients which are plotted as a function of their orientation to obtain a histogram. The histogram provides an easily discernable and accurate detection of the desired edge of the anatomic feature.

In a first embodiment according to the present invention, the method and system for automatic delineation of anatomic edge structure are used to detect posterior rib edges. Vertical profiles are determined in each lung in the digital chest radiograph and a predetermined model function is fit to the vertical profiles to obtain initial estimates of the positions of the rib edges in the chest radiograph. ROIs are defined in the vicinity of the estimated rib edges and edge gradients and their corresponding orientations are determined using a Sobel operator. A maximum edge gradient for each ROI is determined which corresponds to a detected rib edge. Cumulative maximum edge gradients are determined and plotted as a function of their orientation to obtain a histogram. The resulting histogram contains peaks which correspond to detected rib edges. The detected rib edges are also fit with an elliptical function providing a representation of the entire rib structure.

In some cases, due to low signal-to-noise ratio and interference with other anatomic features, all rib edges are not detected. These missing rib edges may be estimated by analyzing the elliptical functions of detecting rib edges and using anatomic knowledge of the variation of rib edges with position within a chest radiograph. The missing rib edges may also be detected by estimating their position from the previously detected rib edges and then performing again the gradient-histogram analysis in the vicinity of the estimated rib edge.

In a second embodiment according to the present invention, automatic delineation using edge gradients and their orientations are implemented to detect pneumothorax in the apical lung region. After the detection of rib edges in a chest radiograph, ROIs are defined in the apical region of each lung in the radiograph. Edge gradients and their corresponding orientations are determined for a plurality of pixels included in each of the ROIs. The ROIs are enhanced using the edge gradients and the corresponding orientations to accentuate edge structure in the ROIs. The detected rib edges are removed from the edge-enhanced ROIs by removing the pixels corresponding to a curved line representing the detected rib edge. A number of pixels surrounding each pixel on a curved line representing a detected rib edge are also removed. Curved-line structure remaining in the edge-enhanced ROIs having rib edges removed are detected using a Hough transform. A strongly accumulated area having accumulated values in a r–θ parameter space is obtained. A pneumothorax pattern is detected using the inverse Hough transform on selected points in the strongly accumulated area in the r–θ parameter space.

The detection of the pneumothorax can be enhanced by eliminating accumulated values in the strongly accumulated area below a first predetermined threshold which removes noise components from the strongly accumulated area. Secondly, accumulated values above a second predetermined threshold are removed which removes components due to rib edges in the strongly accumulated area. The signal-to-noise ratio of the detected pneumothorax pattern is improved.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
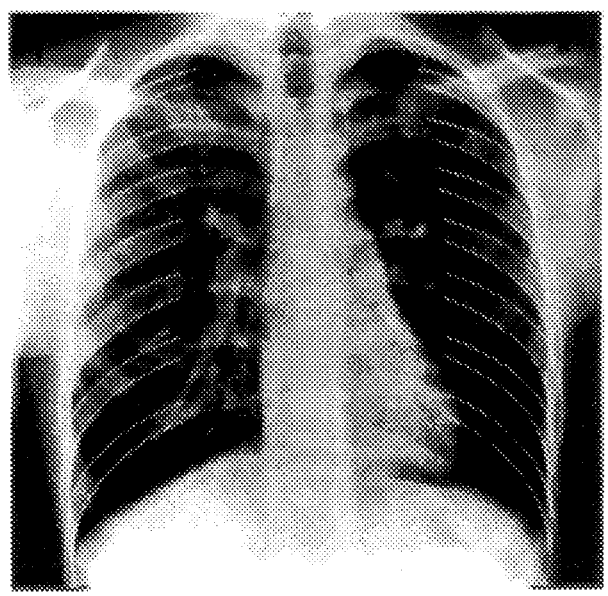
FIG. 1(a) is an illustration of manual fitting of peripheral rib edges using elliptical functions in a digital chest image.

Referring now to the drawings, and more particularly to FIG. 1(a) thereof, wherein a comparison of elliptical functions and actual rib edges in a chest image is illustrated, a first embodiment of the present invention will be described. The chest images illustrated in the drawings are representative of fifty frontal chest images selected mainly from routine cases by the inventors. The digital images were obtained by digitizing the chest radiographs with a Konica laser scanner using a pixel size of 0.175 mm×0.175 mm and a matrix size of 2,000×2,430. Digital images with a small matrix (1,000×1,215) and a large pixel size (0.35 mm×0.35 mm) were also used for computational simplicity. The gray scale used was 10 bits. Further, only the posterior ribs in the peripheral portions of the lungs were considered because accurate delineation of peripheral posterior ribs is adequate for utilizing rib locations in quantitative analysis of digital chest images.

FIG. 1(a) illustrates the comparison of elliptical functions and actual rib edges in a chest image. The location of the peripheral posterior ribs in chest radiographs is usually very similar in shape to a portion of an ellipse, implying that an elliptical function may be used for fitting of the detected edges of peripheral ribs and the smoothing of detected data points. To that end, each elliptical function was generated to match rib edges visually by manual selection of three parameters, namely, the two diameters and the location of the center of the ellipse.

Figure 1B:
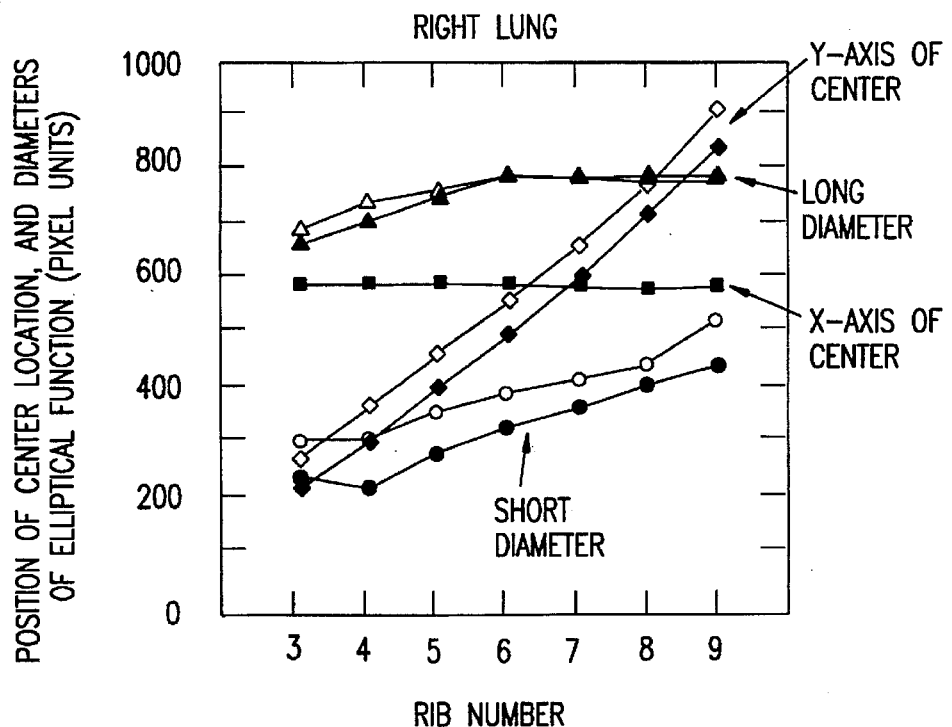
FIGS. 1(b) and 1(c) are graphical representations of the dependence of fitted parameters of the elliptical functions on the location of ribs.
Figure 1C:
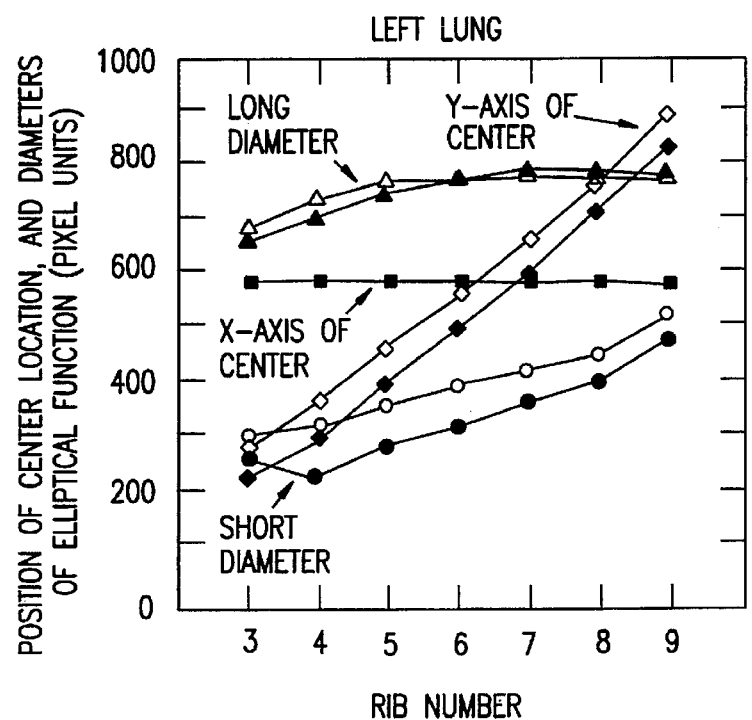

Some parameters of the fitted ellipse are closely related to the geometry of the chest image. For example, the center of the ellipse is at the vertical midline of the chest image, and one-half of the long diameter corresponds to the distance between the rib cage edge and the midline. FIGS. 1(b) and 1(c) show the dependence of the fitted parameters on the location of the ribs. Implied from the geometry of the chest image, the parameters change gradually from one rib to the next. The parameters for the right lung are generally similar to those for the left lung. In addition, the parameters for the upper edges of the ribs (open symbols) are closely related to those for the lower edges of the ribs (closed symbols).

Figure 2:
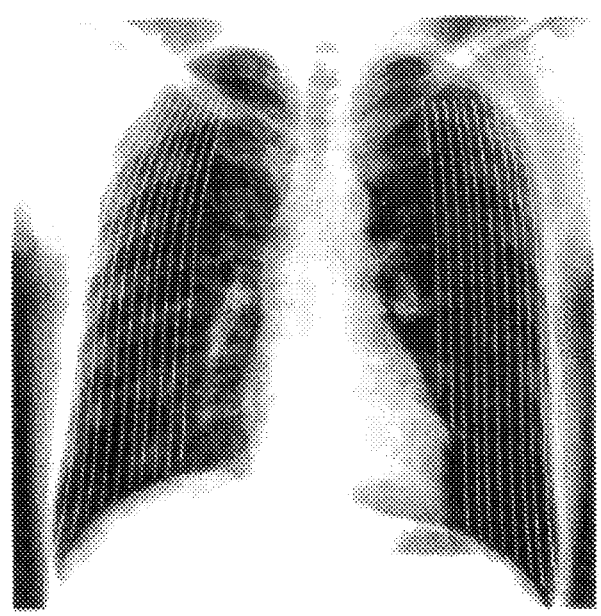
FIG. 2 is an illustration of vertical profiles in a chest radiograph.

According to the first embodiment of the present invention, vertical profiles in the lung regions are determined in order to obtain the rib cage edges by analysis of the horizontal signature, which is then fitted to a third order polynomial function. As shown in FIG. 2, ten profiles are selected which extend in the same direction as the rib cage edges in both lung regions. The profiles are located between approximately 95% and 50% of the distance from the midline of the chest to the corresponding fitted smooth curves defining the rib cage edge boundaries.

Each vertical profile is then fitted with a shift-variant sinusoidal function, which is given by the equation $$f(x) = A \cos(2\pi u(x) x + \phi),$$

where $f(x)$ corresponds to the background trend corrected profile, A is the amplitude of the vertical profile, $\phi$ is a phase term, and $u(x)$ is the spatial frequency at position x. This spatial frequency corresponds to the reciprocal of the rib plus intercostal distance. The rib plus intercostal distance is assumed to change linearly with the position x. The fitting using the shift-variant sinusoidal function obtains initial estimates of the locations of the upper and lower edges of the posterior ribs. This initial estimation of the rib edge locations is performed in the same manner as that disclosed in Doi et al (U.S. Pat. No. 4,851,984).

From these initial estimates of the locations of the upper and lower edges of the posterior ribs, subtle continuous rib edges are detected using a technique termed gradient-histogram analysis (GHA) wherein statistical analysis of edge gradients and their orientations of all pixels in small selected ROIs is performed. GHA makes it possible to determine whether a rib edge is included in a particular ROI and, if so, whether the rib edge is located in the upper or lower margin of the posterior or anterior rib.

Figure 3:
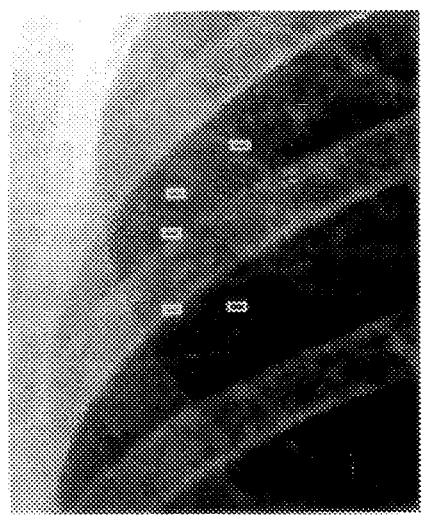
FIG. 3 is an illustration of a chest image with selected ROIs in the right lung.

FIG. 3 shows five ROIs in the right lung, which were selected along the upper and lower margins of both posterior and anterior ribs, and also from the intercostal space. Each ROI is 8×4 pixels and rectangular in shape (longer in the horizontal direction) as most rib edges commonly lie in the horizontal direction. However, other sizes and shapes of ROIs may be used to obtain similar results. The selection of an appropriate size and shape of the ROI should be based on the parameters which yield the best results.

Figure 4:
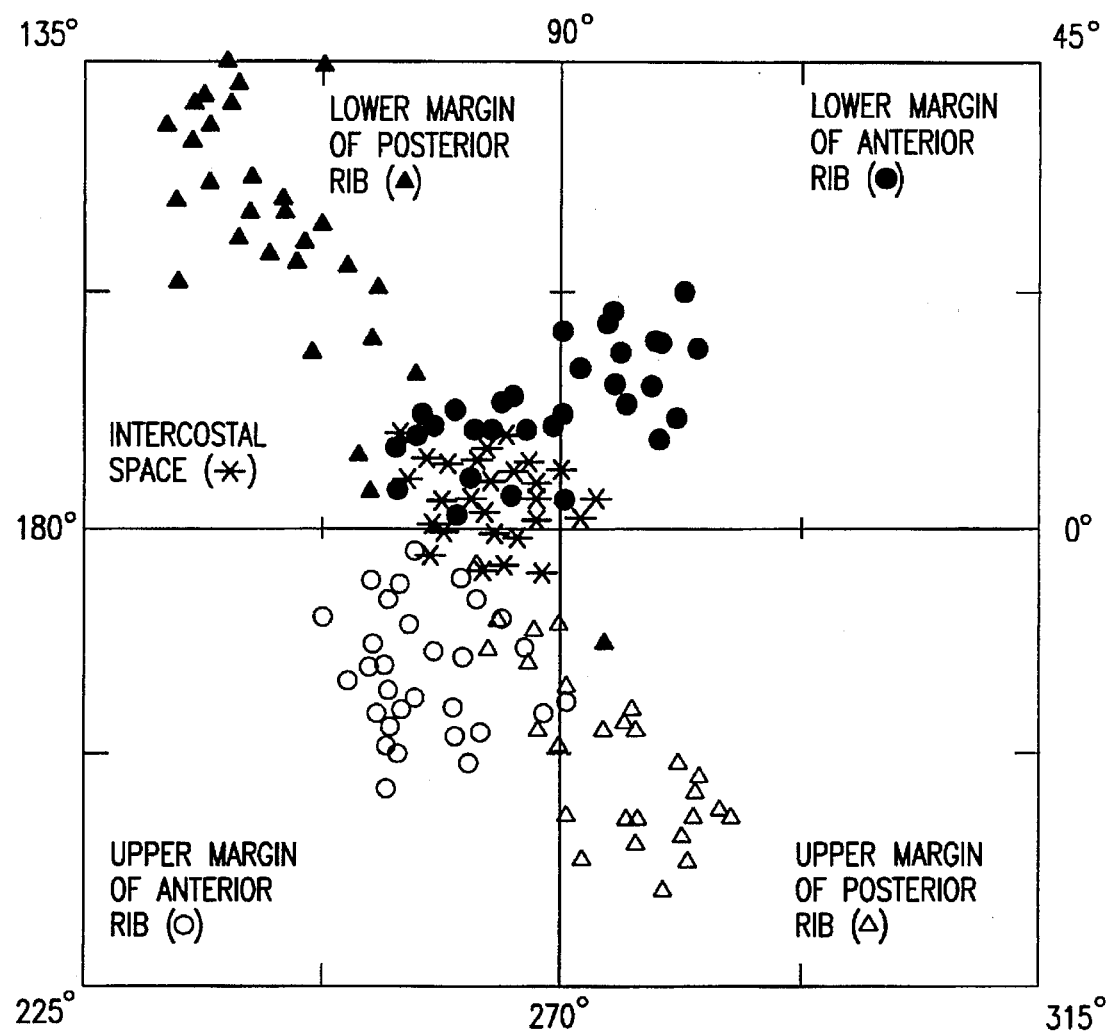
FIG. 4 is a graphical representation of the distribution of edge gradients and their orientations at all 32 pixels included in each of the five ROIs shown in FIG. 3.

The distributions of gradients and their orientations at all pixels included in the five ROIs of FIG. 3 are shown in FIG. 4. The gradient and its orientation denote the maximum edge gradient and its orientation at each pixel, which are obtained from two edge gradients in both vertical and horizontal directions using a Sobel operator or other edge operators may also be used. A Sobel operator is described in Gonzalez et al, "Digital Image Processing", 2nd Ed. (Addison-Wesley, Boston, Mass. 1987), pp. 176–179, which is herein incorporated by reference. The determination of the edge gradients is not limited to the use of a Sobel operator. Other edge operators may be used, such as first and second derivatives, Laplacian operator etc.

The gradients and their orientations are plotted in a polar coordinate system and the magnitude of the maximum edge gradient corresponds to the distance from the origin to a point marked in the diagram. The orientation of the edge gradient is represented by the angle from the horizontal axis on the positive x axis. These distributions may also be obtained by plotting the edge gradients in the horizontal and vertical direction on the abscissa and ordinate, respectively. It is apparent in FIG. 4 that four different rib edges are clearly distinguished from each other and are represented by points in four different quadrants. The intercostal space can also be distinguished from the rib edges, because the intercostal space edge gradients are much smaller than those of the rib edges.

A background trend correction is useful in separating edge gradients due to rib edges and those in the intercostal space, when a non-uniform background trend due to chest wall and gross lung anatomy is involved in each ROI, which is commonly the case. The background trend is estimated by fitting pixel values in each ROI using a two-dimensional polynomial function. The fitted function is subtracted from pixel values in the ROI to provide the trend-corrected ROI. Edge gradients and their orientations are then determined using the Sobel operator. This technique tends to decrease the magnitude and scatter of edge gradients obtained from the intercostal space, and thus is effective in improving the correct identification of rib edges. This background trend correction technique is similar to that described in Doi et al (U.S. Pat. No. 4,851,984).

Figure 5A:
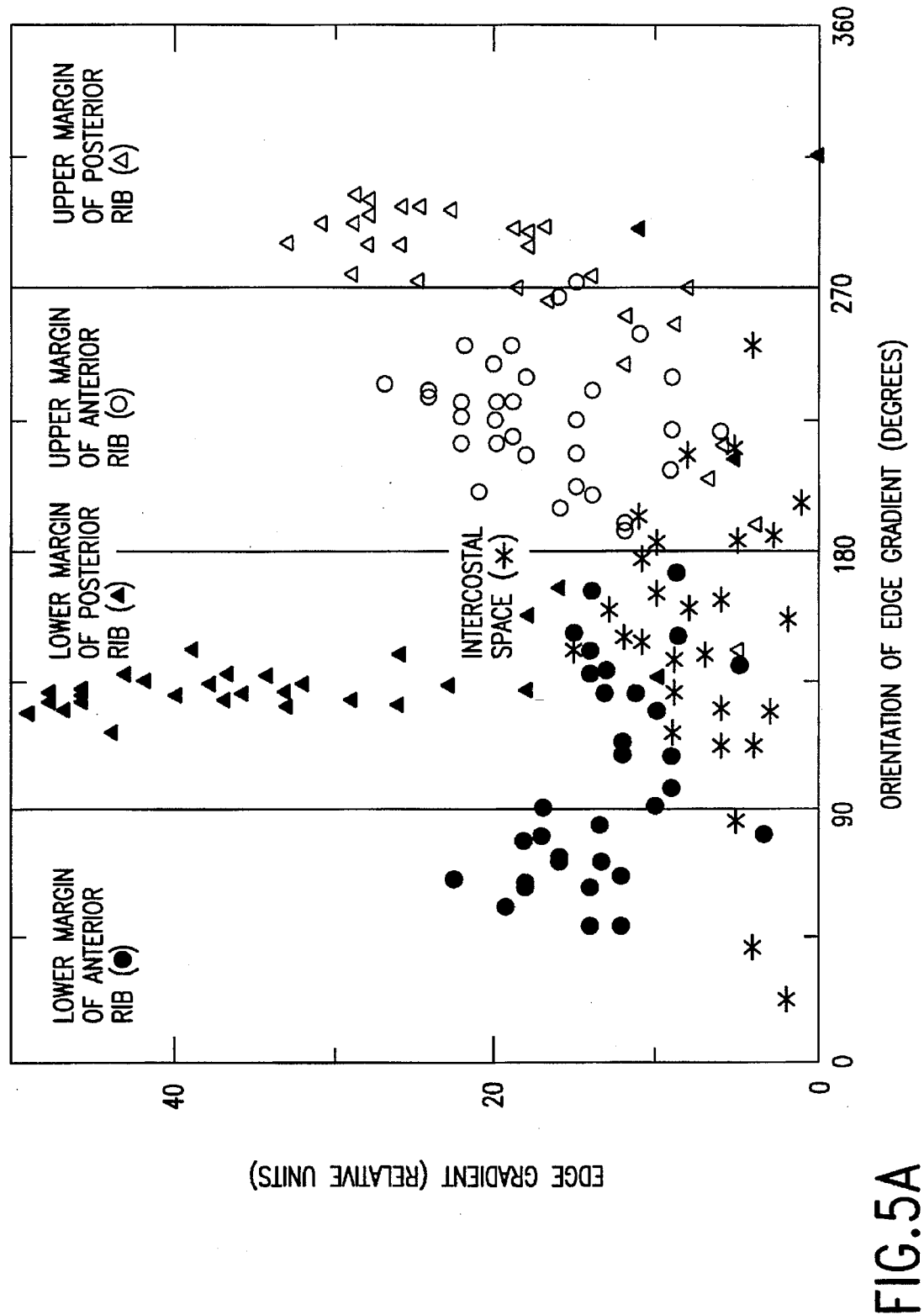
FIG. 5(a) is a graphical representation of the relationship between the edge gradients and their orientations for the five ROIs shown in FIG. 3.
Figure 5B:
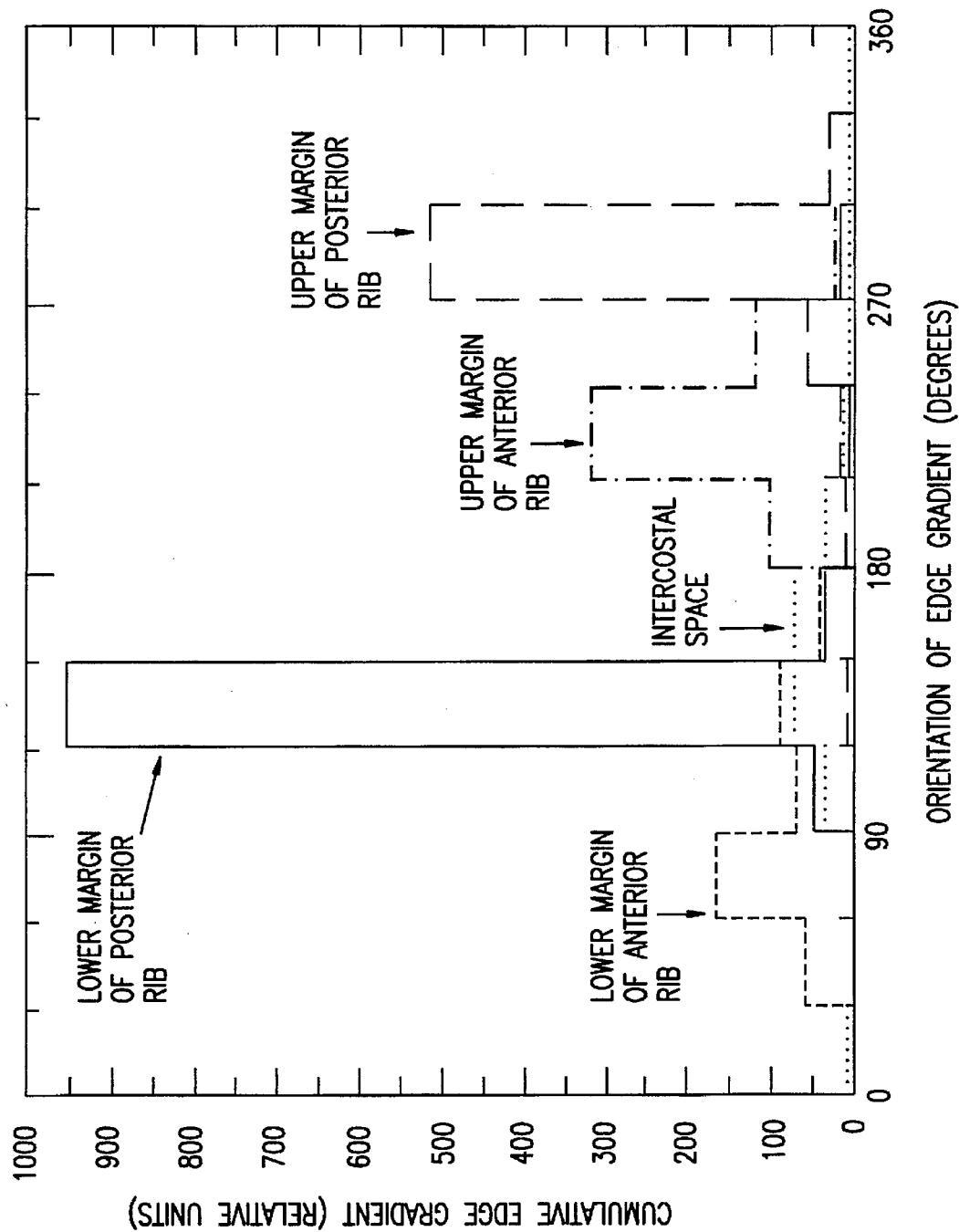
FIG. 5(b) is a histogram of the cumulative gradient as a function of orientation.

In FIG. 5(a), the data in FIG. 4 are displayed with the gradient and orientation plotted on the abscissa and ordinate, respectively. FIG. 5(b) shows the distributions (or histograms) of cumulative gradients as a function of orientation. Cumulative gradients are formed by summing of the edge gradients at each orientation. With the use of the cumulative gradients, it is possible to efficiently identify the presence or absence of a rib edge as well as the nature of the rib edge.

Figure 6A:
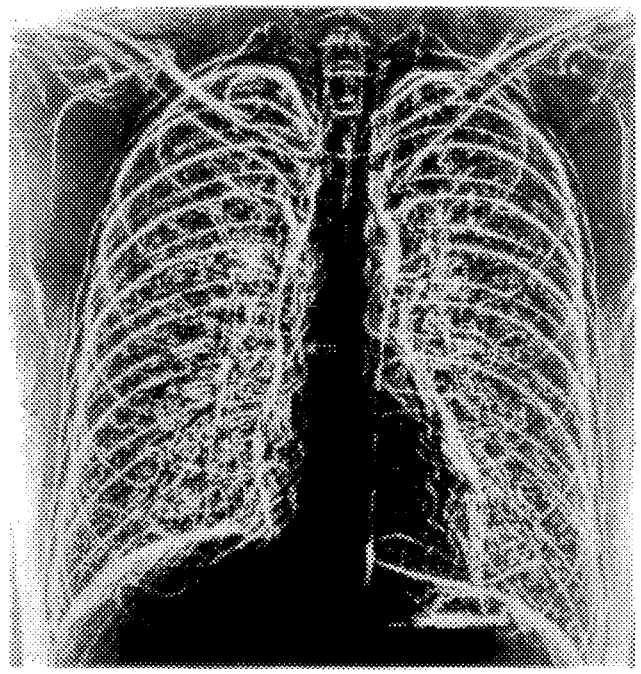
FIG. 6(a) is an illustration of a chest radiograph with rib edges obtained with a Sobel filter.
Figure 6B:
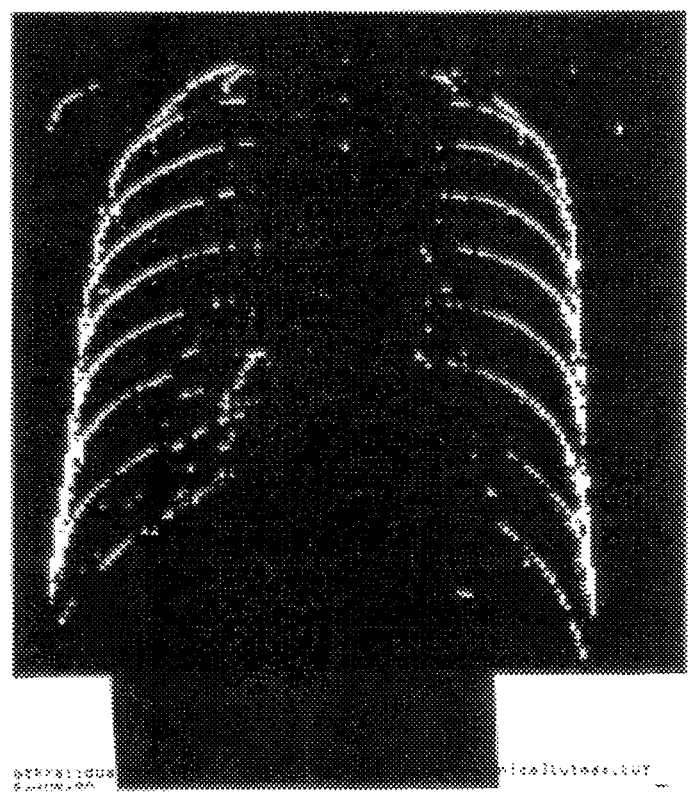
FIG. 6(b) is an illustration of a chest radiograph with rib edges obtained through gradient-histogram analysis.

FIG. 6(a) illustrates a chest image with many edges, oriented in various directions obtained with a Sobel operator. Not only rib edges but also many unwanted edges are apparent when edge gradients in all directions are considered. This indicates that the corresponding signal-to-noise ratio of the rib edges is not very high. FIG. 6(b) shows an image of edges due to the lower margin of posterior ribs obtained with GHA. With GHA, the signal-to-noise ratio of the rib edges is improved, and the lower margins of the posterior ribs are well defined. Although GHA can be applied to the entire chest image, it would be time consuming for computation. Therefore, it is desirable to use GHA only on relatively small regions adjacent to the initially estimated rib edges.

Figure 7:
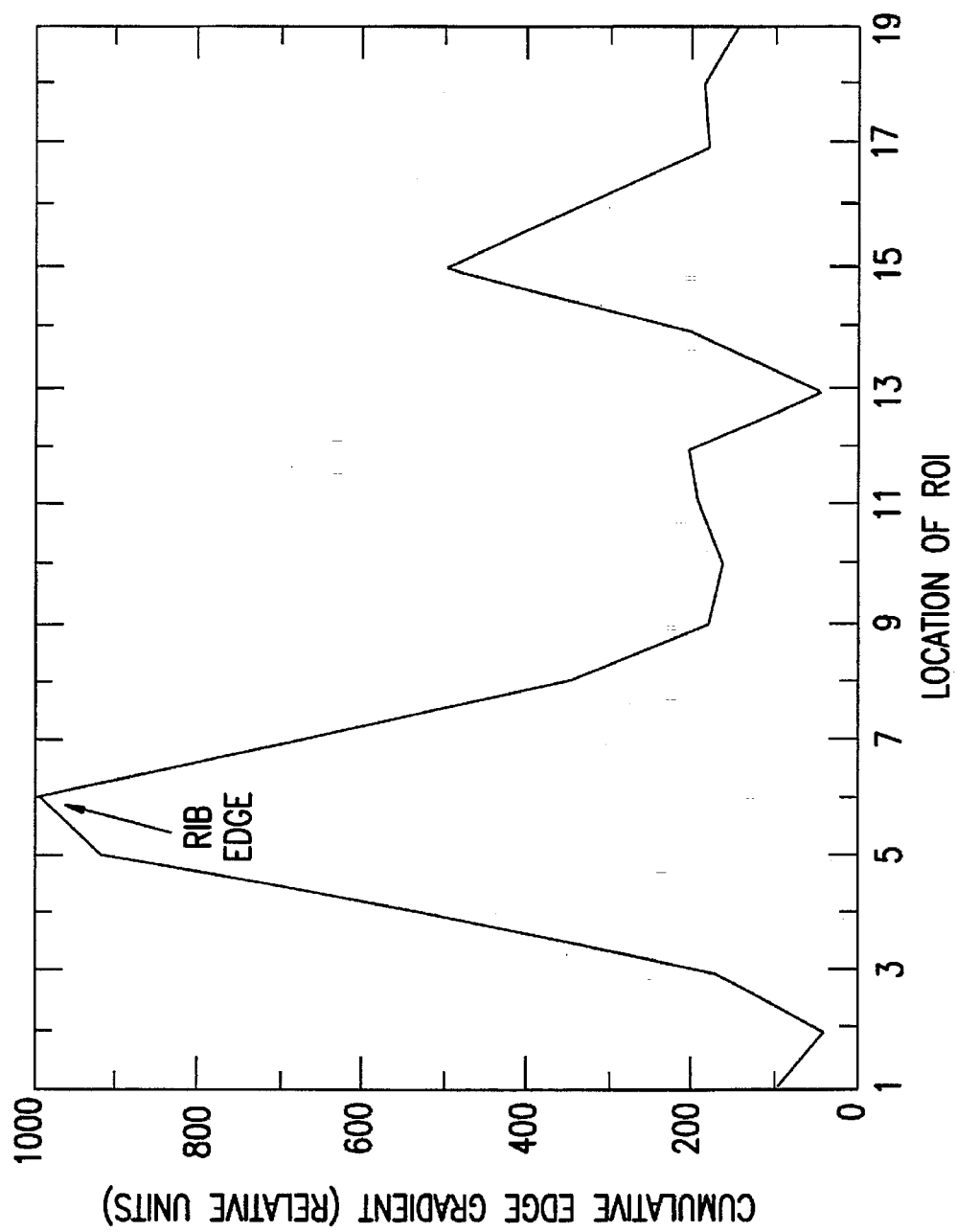
FIG. 7 is a graphical illustration of the determination of a lower edge of a posterior rib.
Figure 8:
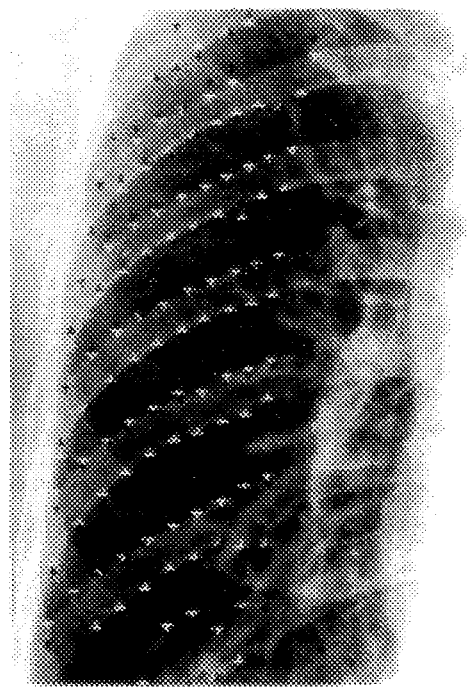
FIG. 8 is an illustration of a chest radiograph comparing the detection of rib edges from vertical profiles (dark markers) and rib edges detected by gradient-histogram analysis (light markers)

An example of the use of GHA in the detection of rib edges is shown in FIGS. 7 and 8. First, the chest image is segmented by continuous rectangular ROIs in the vicinity of the initial edges which are obtained by fitting of the vertical profiles with a shift-variant sinusoidal function, which was described previously. Nineteen ROIs are placed along the vertical direction centered at the initially estimated rib edge. The size of the ROI is desirably 8×4 pixels, but other sizes are possible, and each ROI overlaps one-half of the adjacent ROI. GHA is then performed on all ROIs. A reliable rib edge is finally detected by finding the ROI which provides the largest cumulative edge gradient within a given range of edge orientations.

FIG. 7 illustrates the determination of the lower edge of a posterior rib. The actual rib edge was detected at the upper side of the initially estimated edge. FIG. 8 shows the comparison of rib edges as detected initially from the vertical profiles and accurate rib edges as detected by GHA, and are indicated by dark and light markers, respectively. Almost all edges in the mid and upper ribs are detected accurately by GHA. However, some rib edges in the lower lung region are not detected, because these edges are obscured due to overlap with pulmonary vessels.

Although the majority of rib edges are detected correctly by GHA as described above, some incorrect edge data may be generated and also some edges may not be found due to the extremely low signal-to-noise ratios of some local rib edges. Therefore, in order to obtain estimates of smooth rib edges for those having low signal-to-noise ratios, two methods are employed, namely, horizontal alignment of detected edges and fitting of the detected edges with an elliptical function. Horizontal alignment groups detected edge points into different rib edges. This is accomplished by taking into account the orientation of its gradients for distinction of upper and lower rib edges, and also by examining the vertical position of the detected edge as a function of the horizontal distance. The vertical position of the rib edge decreases gradually towards the rib cage edge in the periphery of the lungs.

When the detected edge points have been grouped together, the rib edges in each group are fitted with an elliptical function, thus producing sets of fitting parameters for a number of rib edges from the top to the bottom rib. Since these parameters change gradually depending upon the location of the rib, as shown in FIG. 1(b), it is possible to estimate a set of fitting parameters for a rib edge which has not been detected. If necessary, the missing rib edges are searched for again by GHA near the potential rib locations estimated from the set of fitting parameters obtained above. This fitting is effective to correct some errors that may have occurred in the initial GHA rib detection.

As a second example of this embodiment, GHA including the horizontal alignment of detected edges and fitting with an elliptical function was performed on 50 chest radiographs. The CPU time using a DEC VAX 3500 computer required for each GHA analysis is approximately 60 seconds for each case. The detected edges are compared with actual rib edges and are classified into three categories, "good", "acceptable" and "inadequate", based on the goodness of fit (or delineation) of detected rib edges compared with actual rib edges.

These categories are defined based upon the fraction of the correctly delineated rib edges relative to the number of desired rib edges in a chest image. The number of desired rib edges which are located in the lung regions and are considered to be required for the acquisition of rib structure, is usually from 20 to 24 (5 to 6 ribs above the diaphragm in each hemithorax). Thus, the good category corresponds to the correct delineation of more than 80% of the total number of desired rib edges, an acceptable delineation is 60% to 80%, and inadequate is the delineation of less than 60% of the desired rib edges.

Figure 9A:
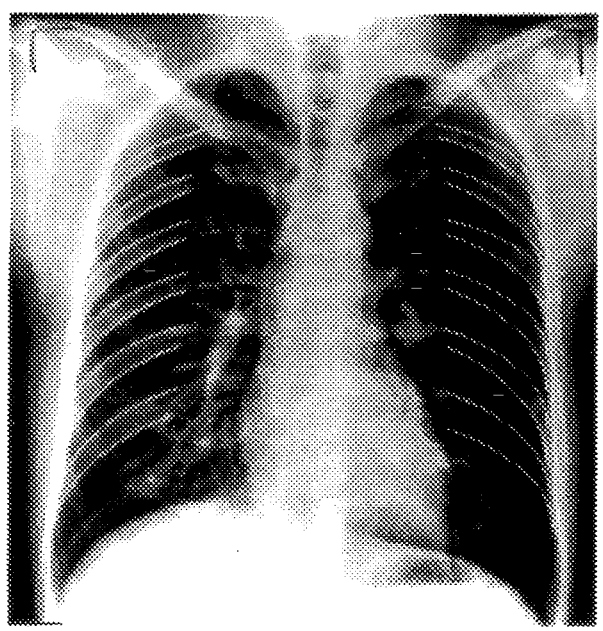
FIGS. 9(a)–(c) are illustrations of a chest radiograph with automated delineation of posterior ribs superimposed on the chest image exemplifying in (a) and (b) "good" cases and in (c) an "acceptable" case.
Figure 9B:
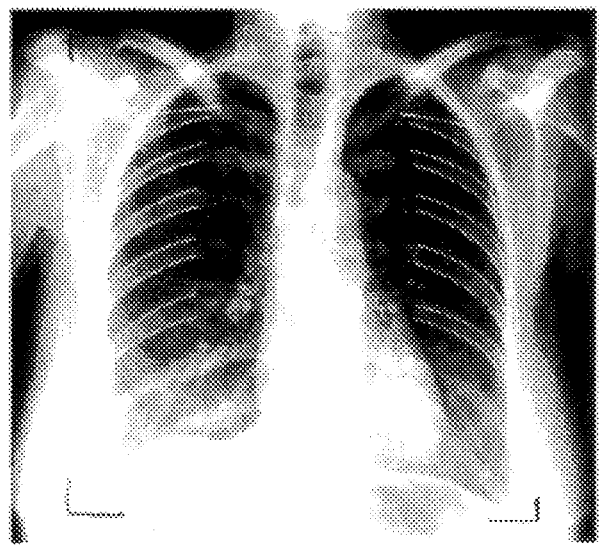
Figure 9C:
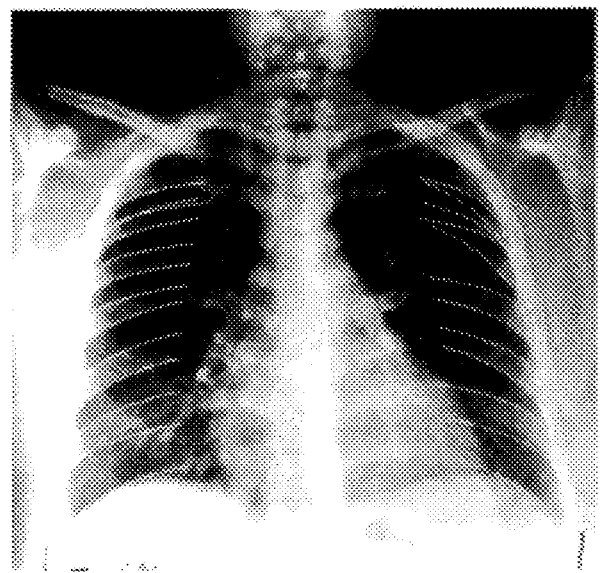

FIGS. 9(a) and 9(b) show two examples of a good case. The results of automated delineation of posterior ribs are marked by white curves, which are superimposed on the chest image. The annotated rib edges are generally in good agreement with actual rib edges. In FIG. 9(a), the edges of the fourth to ninth rib in both lungs are determined correctly except for the lower edge of the ninth rib in the left lung. This was caused by erroneous initial estimation of the rib edges and the subsequent detection of blood vessel edges. In FIG. 9(b), although the image contrast is relatively low, five ribs in both lungs, except for the upper edge of the fourth rib, are correctly determined. However, some lower ribs with very obscure edges are not detected because of incorrect initial estimations for these ribs. In contrast, FIG. 9(c) shows an example of an acceptable case. Here, the edges of the fourth to sixth ribs in the left lung are confused because of some errors in the initial estimation of the rib edges and in the horizontal alignment of detected incorrect edges. Also, because of other incorrect horizontal alignment, one false-positive result occurred in the upper right lung.

The overall results for the 50 cases indicated 37 (74%) good cases, 8 (16%) acceptable cases, and 5 (10%) inadequate cases. The number of false-positive delineations were, on the average, 1.2, 2.5 and 1.2 per chest image for good, acceptable, and inadequate cases, respectively. These false-positives usually occur near the correctly detected edges, and some are located on or below the diaphragm edge.

From these results on the 50 chest radiographs, it is apparent that the correct delineation of rib edges is strongly dependent on the initial estimation of rib edges, and that a false-positive can occur due to incorrect horizontal alignment of edge data. For the lower edges of ribs in the lower lung, when an error in the initial estimation occurs, GHA tends to detect edges of blood vessels, and thus the rib edge detected tends to be shifted below the actual rib edge near the mediastinum.

In some cases, incorrect fitting of rib edges with the elliptical function occurred as a result of erroneous determination of rib cage edges caused by breast shadows over the lower lung. However, the fitting of edge data with an elliptical function is effective not only in yielding good agreement between a detected rib and actual rib edges, but also for estimation of obscure rib edges, which cannot be easily detected, when the dependence of fitted parameters on the elliptical function is utilized. The missing rib edge can be estimated based on the parameters of the elliptical functions obtained for the other edge of the same rib. The missing rib may also be estimated with parameters of elliptical functions derived from other ribs. These two estimation techniques provide generally satisfactorily results. However, false-positives are produced occasionally when the order of aligned edge data does not correctly match the order of the actual rib.

Most false-positives may be eliminated by modification of the first embodiment of the present invention. Estimation of undetected rib edges based upon the dependence of the fitting parameters may be improved by taking into account other radiographic knowledge of ribs such as widths of the ribs and intercostal spaces.

Figure 10:
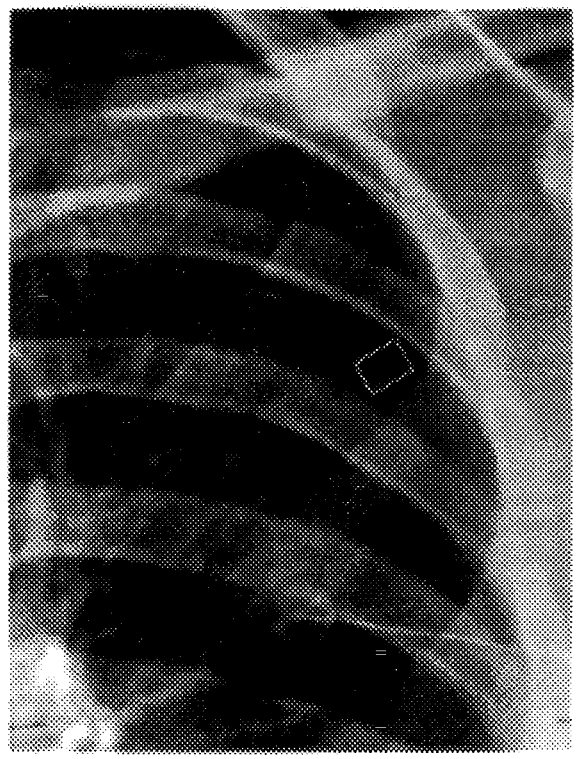
FIG. 10 is an illustration of a chest image with pneumothorax in the apical lung, a ROI marked with a white rectangle selected over a fine line pattern due to pneumothorax.
Figure 11:
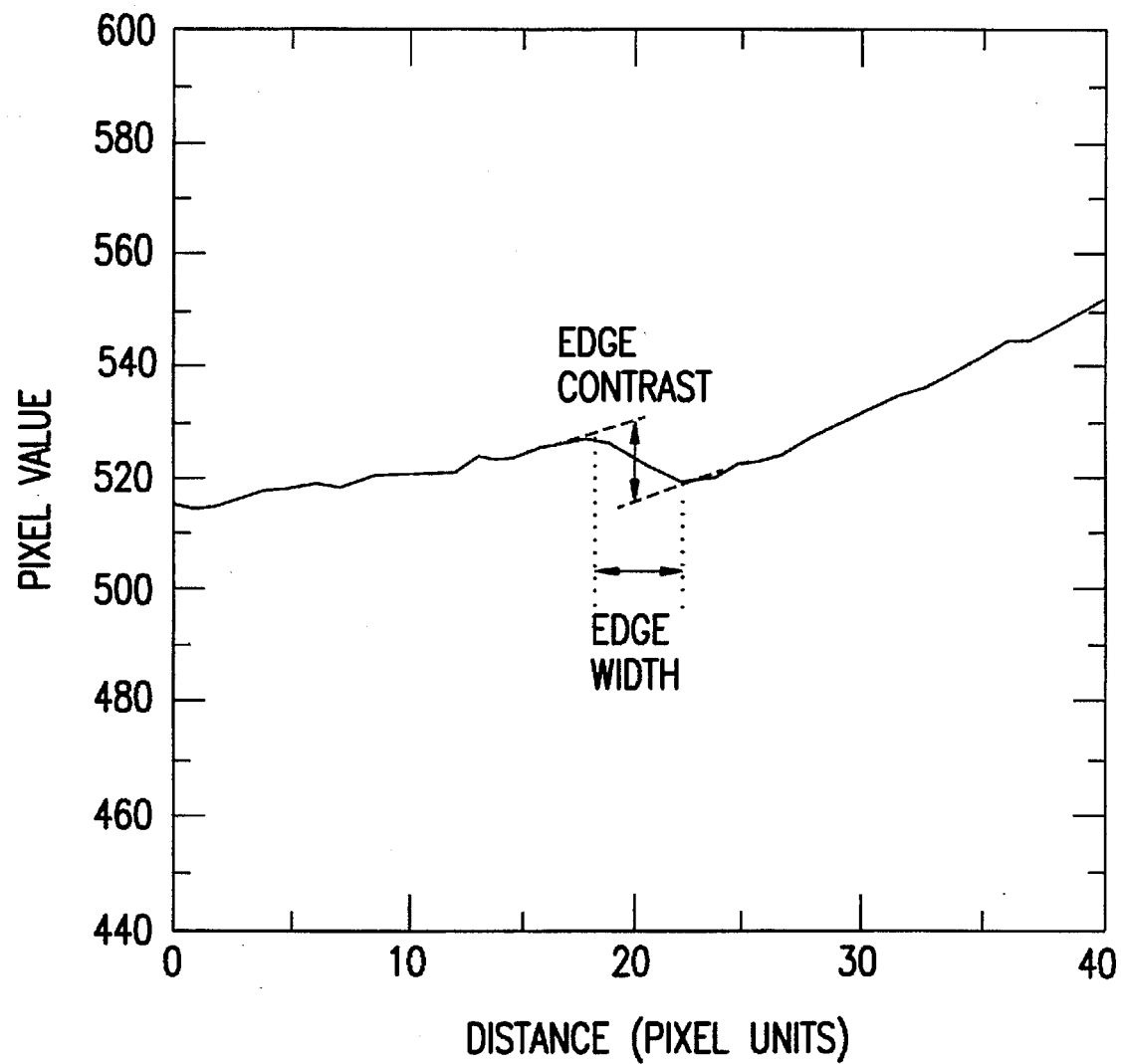
FIG. 11 is a graphical representation of the average image profile across the pneumothorax pattern of FIG. 10 indicating sharp and low edge contrast.

In a second embodiment according to the present invention, GHA is used to detect pneumothorax in the apical lung. An example of pneumothorax in a postero-anterior (PA) chest radiograph is shown in FIG. 10, and the average image profile of the pneumothorax pattern in the ROI is shown in FIG. 11. The average image profile of FIG. 11 indicates the distribution of pixel values in a direction perpendicular to the pneumothorax pattern. Since many profiles are averaged over the width of approximately 50 pixels (length of the short side of the ROI), radiographic noise is almost eliminated in the average profile. However, if the distribution along a profile one pixel wide is illustrated, it becomes impossible to recognize an edge due to the pneumothorax pattern because of the high level of radiographic noise.

It is apparent in FIG. 10 that the pneumothorax pattern contains a subtle sharp edge with very low contrast, and the edge of the pneumothorax has a slightly larger gradient than that of the background trend. The gradient of the edge of pneumothorax is in the direction opposite to that of the background trend. This corresponds to the fact that the average density in the apical lung field decreases gradually toward the upper outer corner of the rib cage edge, but increases sharply when crossing the pneumothorax pattern. Hence, the pixel value is inversely proportional to the optical density.

Eight chest images with similar pneumothorax patterns were analyzed and the results are summarized in Table 1.

TABLE 1

Summary of Measured Edge Width and Contrast
of Pneumothorax Patterns in Eight PA Chest Radiographs

| Case No. | Edge width (mm) | Edge contrast (pixel units) |
| --- | --- | --- |
| 1 | 0.30 | 14.9 |
| 2 | 0.41 | 16.2 |
| 3 | 0.24 | 8.4 |
| 4 | 0.46 | 15.5 |
| 5 | 0.48 | 16.1 |
| 6 | 0.22 | 10.5 |
| 7 | 0.40 | 11.3 |
| 8 | 0.24 | 14.5 |
| average | 0.34 ± 0.10 | 13.4 ± 2.9 |
|  |  | 0.040 ± 0.009 (optical density) |

The average edge width and the average contrast of the sharp line structures due to pneumothoraces are 0.34 mm and 0.04 in optical density units, respectively. The edge width obtained from the image profile as shown in FIG. 11 is only an estimate which tends to be an over-estimate because of the averaging of many profiles across the pneumothorax pattern and also due to a relatively large pixel size (0.175 mm). It is therefore likely that an actual edge widths of pneumothorax patterns are much smaller (and thus very sharp) than the results of the measurements shown in Table 1.

In the second embodiment according to the present invention, the rib cage edge, the top and bottom of the lung, which are useful parameters indicating the lung regions, can be obtained using the analysis of the horizontal signature in a manner such as that disclosed by Doi et al (U.S. Pat. No. 4,851,984). In order to facilitate an efficient detection of the pneumothorax pattern, ROIs are determined along the rib cage edge in both apical areas of the lungs where subtle pneumothoraces commonly appear.

Figure 12:
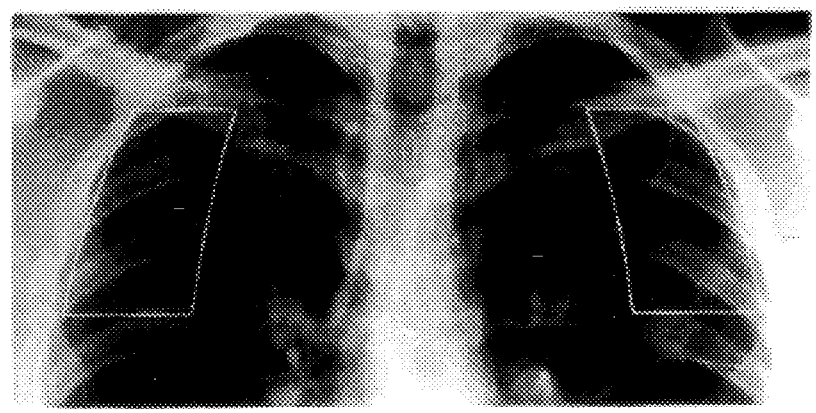
FIG. 12 is an illustration of a chest radiograph with two ROIs selected in apical lungs.

An example of such ROIs is shown in FIG. 12. The right and left vertical boundaries of the ROI are selected at, for example, 95% and 60%, respectively, of the distance from the midline of the chest image to the corresponding fitted smooth curve defining the boundary of the rib cage edge. The upper and lower horizontal boundaries of the ROI are determined at, for example, 10% and 40%, respectively, of the distance from the detected top to the bottom of the lung. The criteria for selecting the ROI boundaries are determined empirically. The larger the area of the ROI, the more difficult the detection of the pneumothorax pattern because of an increase in the number of rib structures in the ROI. However, the selection of a very small ROI may fail to include a sufficiently large portion of the pneumothorax pattern, making its detection more difficult.

Figure 13A:
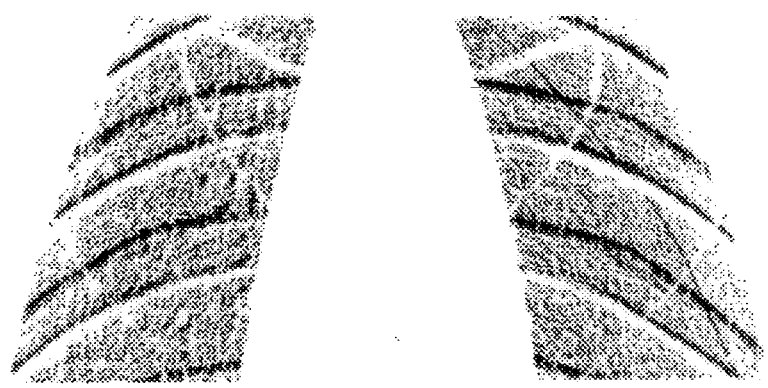
FIG. 13(a) is an illustration of the two ROIs selected in apical lungs of FIG. 12 after edge enhancement.

The subtle pneumothorax pattern in the ROI is then enhanced. First, the orientation of the edge gradient is determined by the use of a Sobel filter in two orthogonal directions. To obtain accurate edge gradients of the pneumothorax pattern, the kernel size of the Sobel filter was chosen to be 3×3 pixels by taking into account the edge width of the pneumothorax patterns. FIG. 13(a) illustrates an edge-enhanced image based on the edge gradient within a certain limited range of its orientation. The range is selected such that the optical density in the chest image increases towards the upper outer corner in the apical lung. This density change includes edges due to the pneumothorax pattern. The pneumothorax is clearly visualized as a thin dark dotted line in FIG. 13(a). However, some rib edges are also enhanced and result in relatively thick dark lines being present in the enhanced image, since the orientations of the edge gradients for some rib edges are in the same range as those for the pneumothorax pattern. Also, many isolated noise components are due to radiographic mottle included in the chest image. Thick white lines as seen by lack of noise components are due to anterior ribs and clavicles, the orientations of their edge gradients being in a direction roughly perpendicular to those of the pneumothorax pattern.

Figure 13B:
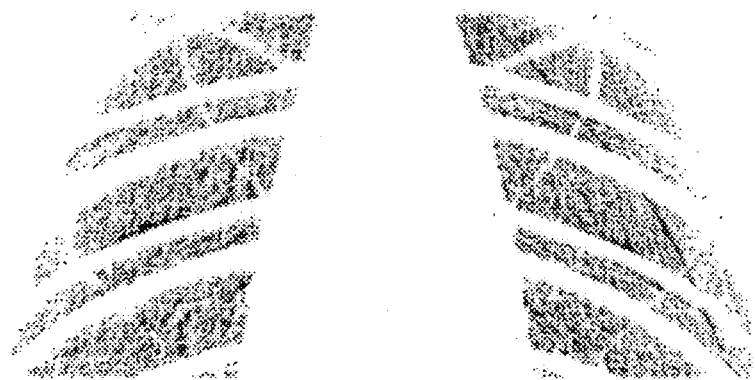
FIG. 13(b) is an illustration of the edge enhanced image of FIG. 13(a) after removal of posterior rib edges.
Figure 14:
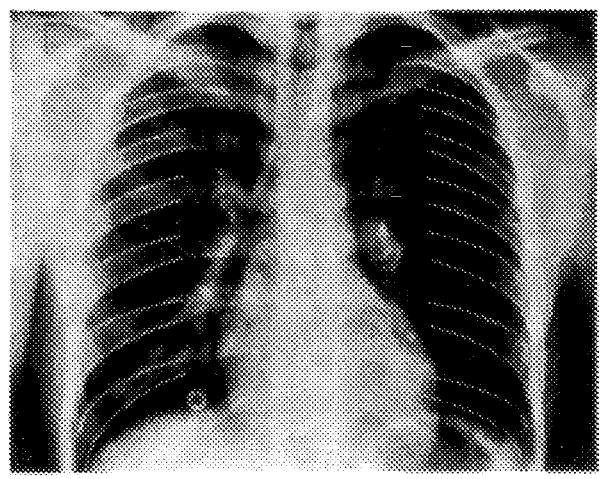
FIG. 14 is an illustration of a chest radiograph depicting automated computerized detected posterior rib edges.

The rib edges are then removed from the enhanced image. In order to remove these edges, the computer output from the analysis of the automated delineation of the posterior ribs (as shown in FIG. 14) is used, which is described above and omitted here for brevity. To distinguish a pneumothorax pattern from rib edges, the rib edges and adjacent areas within a certain width, for example ±20 pixels around the fitted elliptical curves, were removed. This width is determined empirically, and the result is shown in FIG. 13(b). It is apparent from FIG. 13(b) that most rib edges which are seen as thick dark lines in FIG. 13(a) are now replaced by white bands. However, there are still many noise components and some residual rib components remaining in the image. It is desirable to remove these components, which is done by thresholding. The threshold level used in the removal of these components is determined by analysis of each component, which will be referred to as an island, that corresponds to a set of eight neighboring connected pixels.

Figure 15:
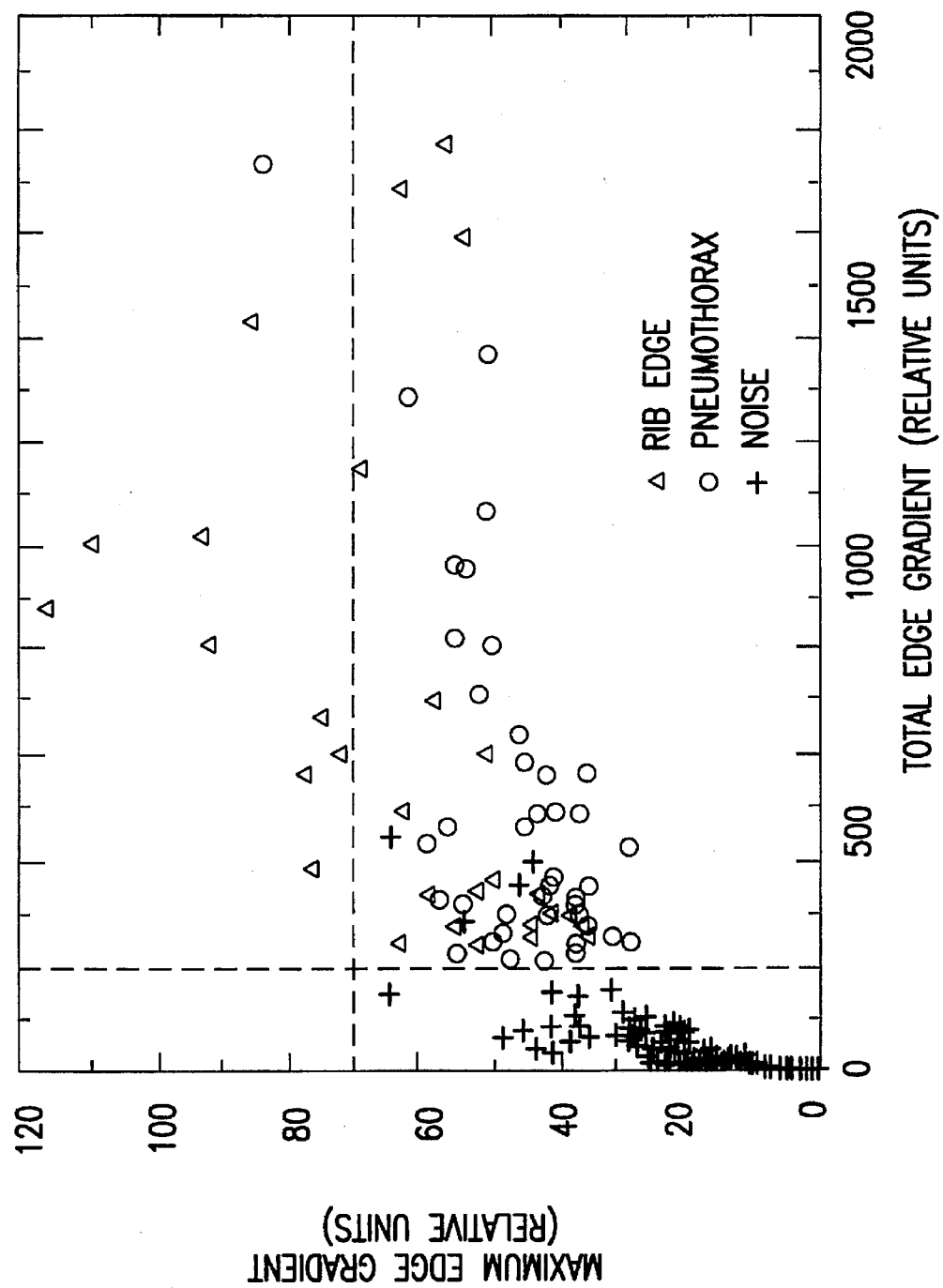
FIG. 15 is a graphical representation illustrating the relationship between the maximum edge gradient to the total edge gradient of an island corresponding to an isolated dark area in FIG. 13(b)

FIG. 15 illustrates the relationship between the maximum and total edge gradient for islands included in edge enhanced images. The maximum edge gradient corresponds to the largest edge gradient value within the island. The total edge gradient corresponds to the total (or summation) of all edge gradient values over the entire area of the island. The maximum edge gradients of the residual rib edges are usually greater than those of the pneumothorax, as shown by the circles and triangles in FIG. 15, as rib edges have generally greater contrast than do pneumothorax edges.

Figure 13C:
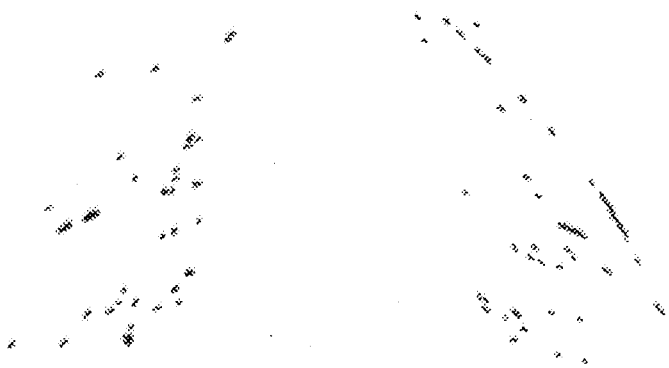
FIG. 13(c) is an illustration of the image shown in FIG. 13(b) after removal of image noise components.

Also shown in FIG. 15 is the total edge gradients of image noise components, which are generally smaller than those of either rib edges or pneumothoraces. This is because the area of the island due to an image noise component is generally smaller than that due to a pneumothorax. Therefore, to distinguish pneumothorax from the rib edges and the image noise components, all islands except those in the lower right rectangular area indicated by the dashed lines in FIG. 15 are eliminated. FIG. 13(c) shows the edge-enhanced image after removal of the rib edges and image noise components. The pneumothorax pattern is recognizable and the signal-to-noise ratio of the pneumothorax pattern is improved.

Figure 16A:
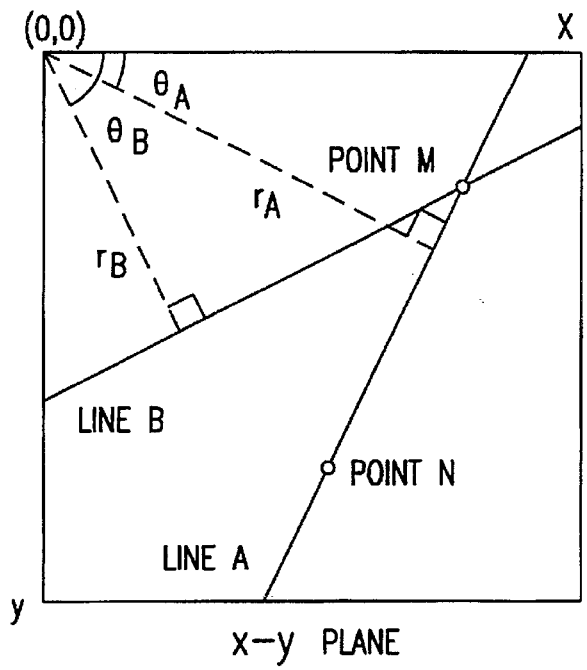
FIGS. 16(a) and (b) are graphical representations illustrating two straight lines a and b in an x-y plane which are represented by two points $(r_a, \theta_a)$ and $(r_b, \theta_b)$, respectively, in the Hough transform parameter space, and the points m and n in the x-y plane are represented by two sinusoidal curves in the parameter space.
Figure 16B:
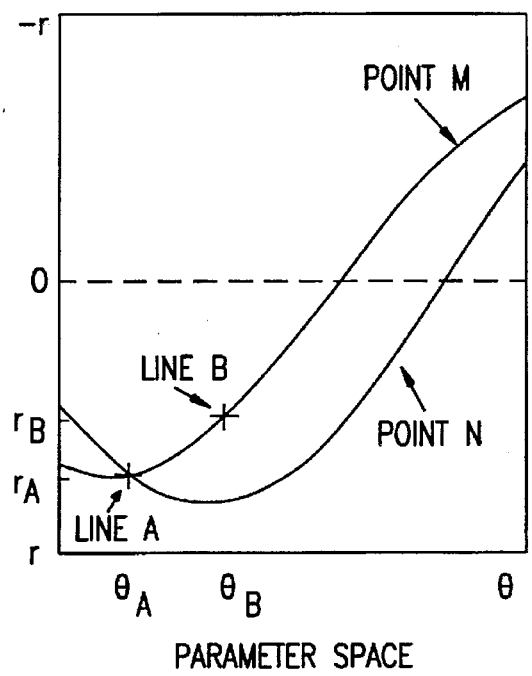

Points located on a curved line in the image which is suspected of being a pneumothorax are detected using a Hough transform. The Hough transform is described by Gonzales et al, ibid, and omitted here for brevity. Using the Hough transform, straight lines in an x-y plane can be represented by points in an r–θ parameter space as illustrated in FIGS. 16(a) and 16(b). The distance r equals the perpendicular distance from the origin to the straight line and the angle θ is the angle from the x-axis to the perpendicular line to this straight line. The relationship between the coordinates in the two systems is therefore described by $$r = x\cos\theta + y\sin\theta.$$

Using this relationship, a point in the x-y plane becomes a sinusoidal curve in the parameter space. Therefore, when there are many (but a finite number of) discrete points on the same straight line in an x-y plane, the line can be determined or estimated from analysis of accumulated values in the parameter space. All sinusoidal curves due to all discrete points go through a point in the parameter space and this point represents a straight line in the x-y plane. The conversion of a point or points in the parameter space to a line or lines in the x-y domain may be called the inverse Hough transform.

Figure 17:
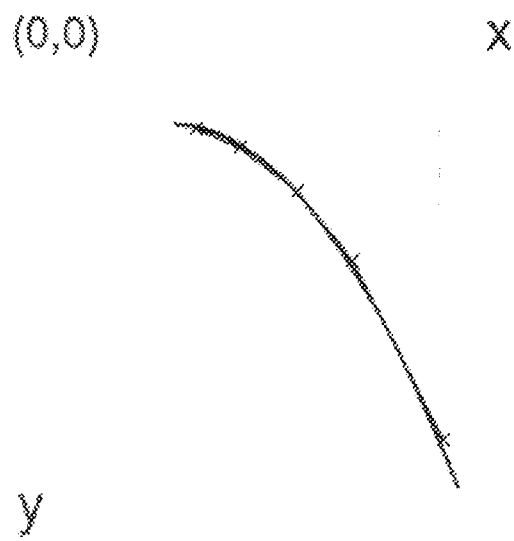
FIG. 17 is a graphical representation of a curved-line simulation of a pneumothorax pattern, each of five points marked by an X being connecting points of two lines obtained by the inverse Hough transform of two adjacent points in a strongly accumulated elongated area of the parameter space shown in FIG. 18.
Figure 18:
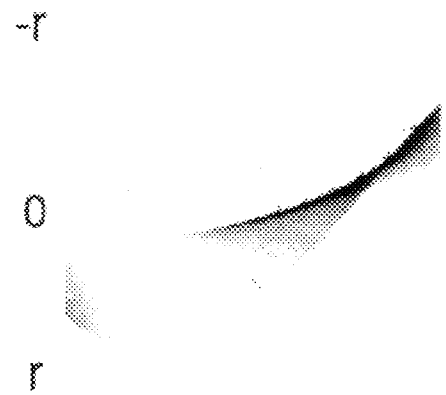
FIG. 18 is a representation of the Hough transform of the curved line simulating a pneumothorax pattern shown in FIG. 17, with the strongly accumulated elongated area represented by six points each marked by a plus symbol.

The Hough transform is used to detect the pneumothorax pattern as described in the following manner. A curved line simulating a pneumothorax pattern is shown by a thick curve in FIG. 17, and its corresponding Hough transform is shown in FIG. 18. The points lying on the curved line in FIG. 17 are represented by many sinusoidal curves and thus produce a strongly accumulated elongated (dark) area in the parameter space as shown in FIG. 18. If this accumulated area is approximated by a single point with a very large accumulated value, then the curved line should have been nearly a straight line. This is an obvious consequence of the basic relationship between the paired patterns in the spatial domain and in the parameter space.

However, if the accumulated area is approximated by several adjacent points such as those marked by a plus in FIG. 18, then the curved line could be represented by a number of segments of straight lines, as illustrated by the thin line segments connected via x's in FIG. 17. Each end of the line segment marked by an x corresponds to the connecting point of two straight lines which are obtained from the inverse Hough transform of two adjacent points in the parameter space in FIG. 18. In order to obtain points representing the strongly accumulated area in the parameter space, the distance r is determined at each angle θ with an appropriate increment, yielding the maximum accumulated value above a certain threshold value. Inverse Hough transforms of these data points on r and θ provide the line segments representing a curved line. In FIG. 18, the original thick curve is similar to the thin connected line segments. Thus, the curved line which represents a pneumothorax pattern can be detected using the Hough transform.

Figure 19:
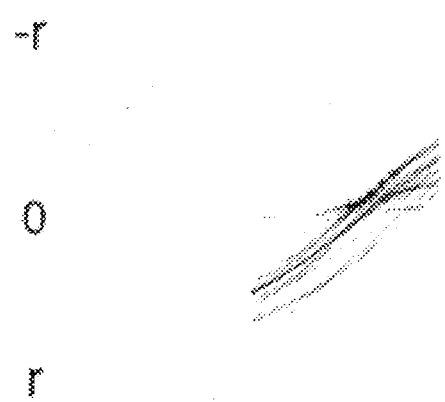
FIG. 19 is a representation of the Hough transform of the edge enhanced image in FIG. 13(c)
Figure 20:
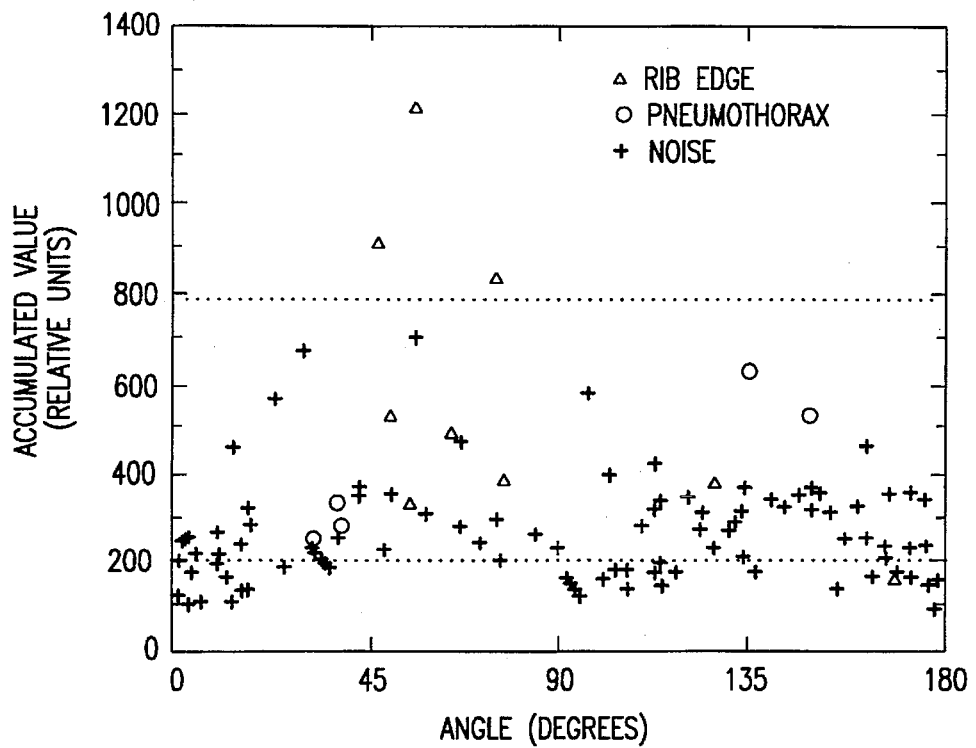
FIG. 20 is a graphical representation of the distribution of accumulated values for islands due to rib edges, pneumothorax and image noise.

For the detection of an actual pneumothorax pattern in a chest image, the Hough transform is applied on the edge-enhanced image shown in FIG. 13(c), and the inverse Hough transform is subsequently applied to data points in the strongly accumulated elongated area in the parameter space. In some clinical cases however, some noise components in the edge-enhanced image produce strongly accumulated values in the parameter space due to many overlaps of sinusoidal curves, as illustrated in FIG. 19. Therefore, in order to correctly identify the island (strongly accumulated elongated area) due to the pneumothorax pattern, the nature of the accumulated values in the parameter space are analyzed. FIG. 20 shows the distribution of accumulated values for islands in the Hough transform parameter space and their corresponding locations on the θ-axis, obtained from 5 chest images. The accumulated values of the residual rib components, marked with a triangle, are generally greater than those of the pneumothorax, which are marked by a circle. Also, the image noise components marked by a plus tend to be smaller than the components of the pneumothorax pattern. Therefore, the island derived from the pneumothorax can be distinguished from islands derived from ribs and islands derived from image noise components by thresholding at a high and a low accumulated value, illustrated by the two dotted lines in FIG. 20.

Figure 21:
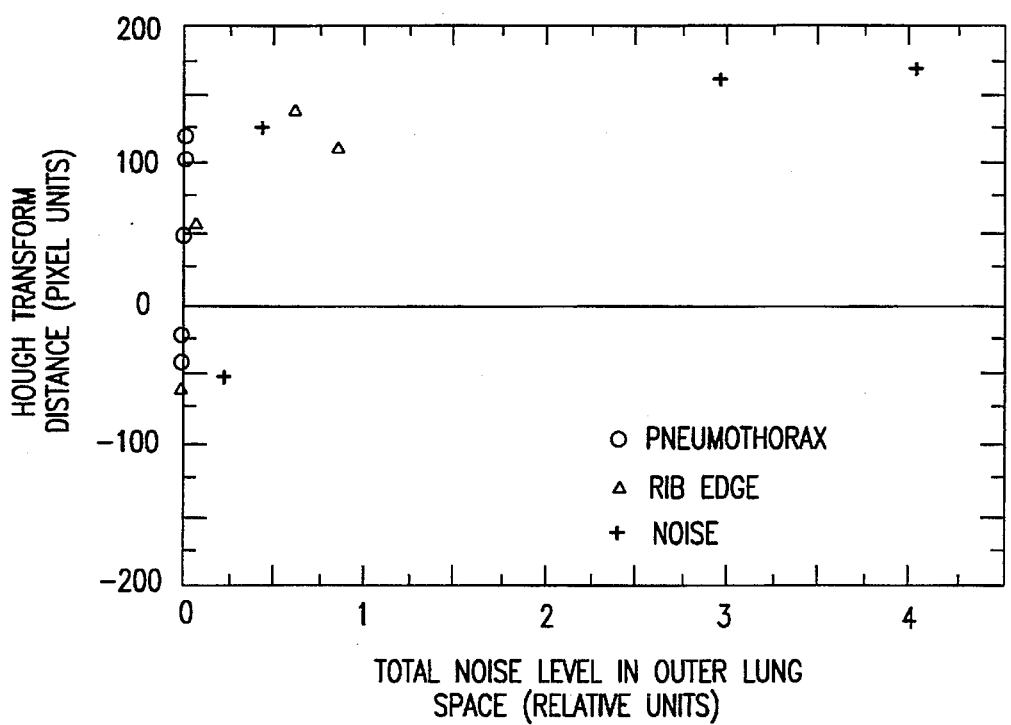
FIG. 21 is a graphical representation of the distribution of total accumulated noise in outer lung space due to pneumothorax, rib edge and image noise.

The total accumulated noise level in the outer lung space for a pneumothorax pattern is zero, or nearly zero, but the noise level for image noise and rib edges tends to have a detectable value, as shown in FIG. 21. The Hough transform distance as shown by the ordinate corresponds to r in the parameter space, indicating the location of the island due to pneumothorax, rib edge or image noise. The total accumulated noise level equals the summation of accumulated values in the distance (at a given θ) range greater than the Hough transform distance of the island defined above. The variation in noise levels may be explained by the fact that there is no lung structure such as small vessels and lung texture in an outer space of the lungs associated with a pneumothorax pattern. Therefore, when a potential pneumothorax island is detected, the noise levels in the outer lung space are examined to distinguish a pneumothorax pattern from other components. As one of the most important radiographic findings of pneumothorax by a radiologist is the lack of lung structure in the outer space, the present invention provides extremely valuable information to the radiologist in the diagnosis of a pneumothorax.

Figure 22:
FIG. 22 is an illustration of a chest radiograph with detected points of a pneumothorax pattern depicted on the chest image obtained from the inverse Hough transform of the five points representing a strongly accumulated elongated area in the Hough transform parameter space shown in FIG. 19.

An example of the detection of pneumothorax according to the second embodiment of the invention is shown in FIGS. 22 and 23. The analysis of these radiographs was performed using a DEC VAX 3500 computer and approximately two minutes of CPU time was required for each case.

Figure 23A:
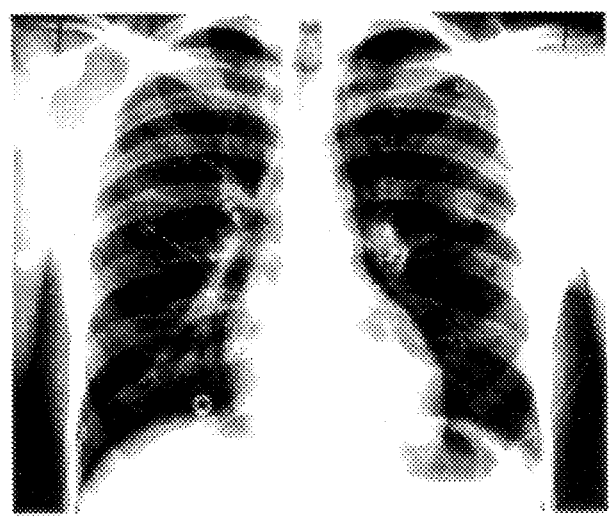
FIGS. 23(a) and (b) are illustrations of chest images with correct automated detections of pneumothorax in apical lung.
Figure 23B:
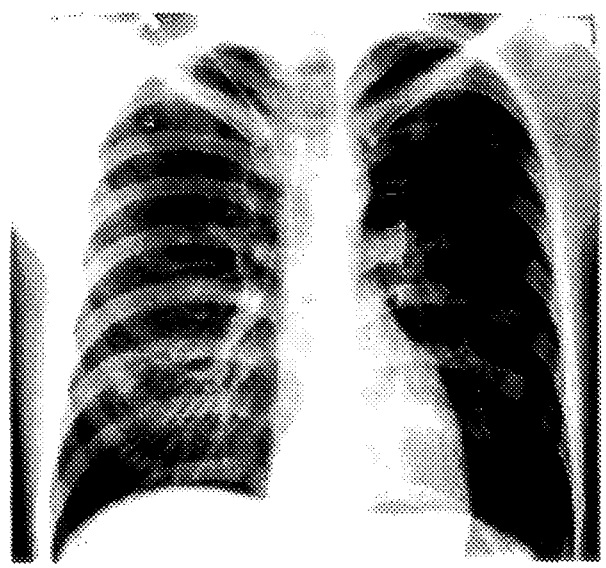

FIG. 22 shows four detected points of a pneumothorax pattern superimposed on the chest image, as indicated by the white x's. The pneumothorax pattern is correctly detected. These detected points are fitted with a second order polynomial function, and annotated with arrows with appropriate positions as shown in FIGS. 23(a) and FIGS. 23(b). Thus, pneumothoraces can be accurately detected by selection of edge gradients oriented only toward the upper peripheral region of the lungs. Subtle patterns of pneumothoraces can be identified using the Hough transform after eliminating rib edges and image noise components. The curved lines obtained by the inverse Hough transforms are in good agreement with actual pneumothoraces. It is therefore possible to detect a subtle pneumothorax by a computerized automated analysis of digital chest radiographs which provides important information to radiologists and improves the diagnosis of pneumothorax.

Figure 24:
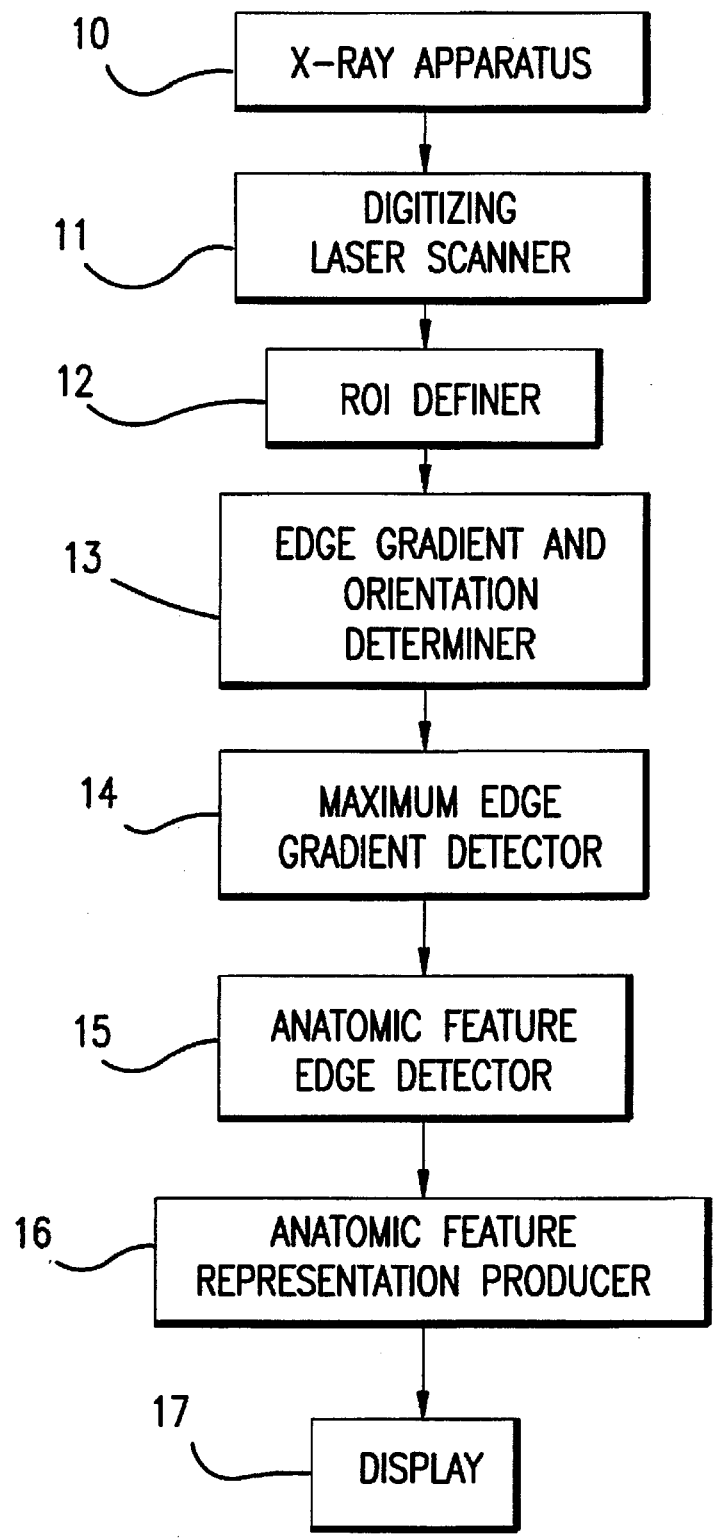
FIG. 24 is a block diagram of a first embodiment of the system according to the present invention.

The system according to the present invention is shown in FIG. 24. An x-ray apparatus 10 is used to acquire a chest radiograph from a subject. The acquired radiographs are digitized using a laser scanner, such as the previously mentioned Konica laser scanner. The output of the laser scanner 11 is used by an ROI definer 12 to define ROIs which include regions in the chest radiograph having edge structure of an anatomic feature to be detected. Using the defined ROIs, an edge gradient and orientation of the edge gradient determiner 13 determines the edge gradient and its orientation for each of a plurality of pixels included in the each ROI. A maximum edge gradient detector 14 determines the maximum edge gradient in each ROI. Based upon the maximum edge gradients detected by the detector 14, the anatomic feature detector 15 detects the edge structure of a desired anatomic feature, and produces a representation thereof. The representation is then displayed on display 17, such as a CRT.

Figure 25:
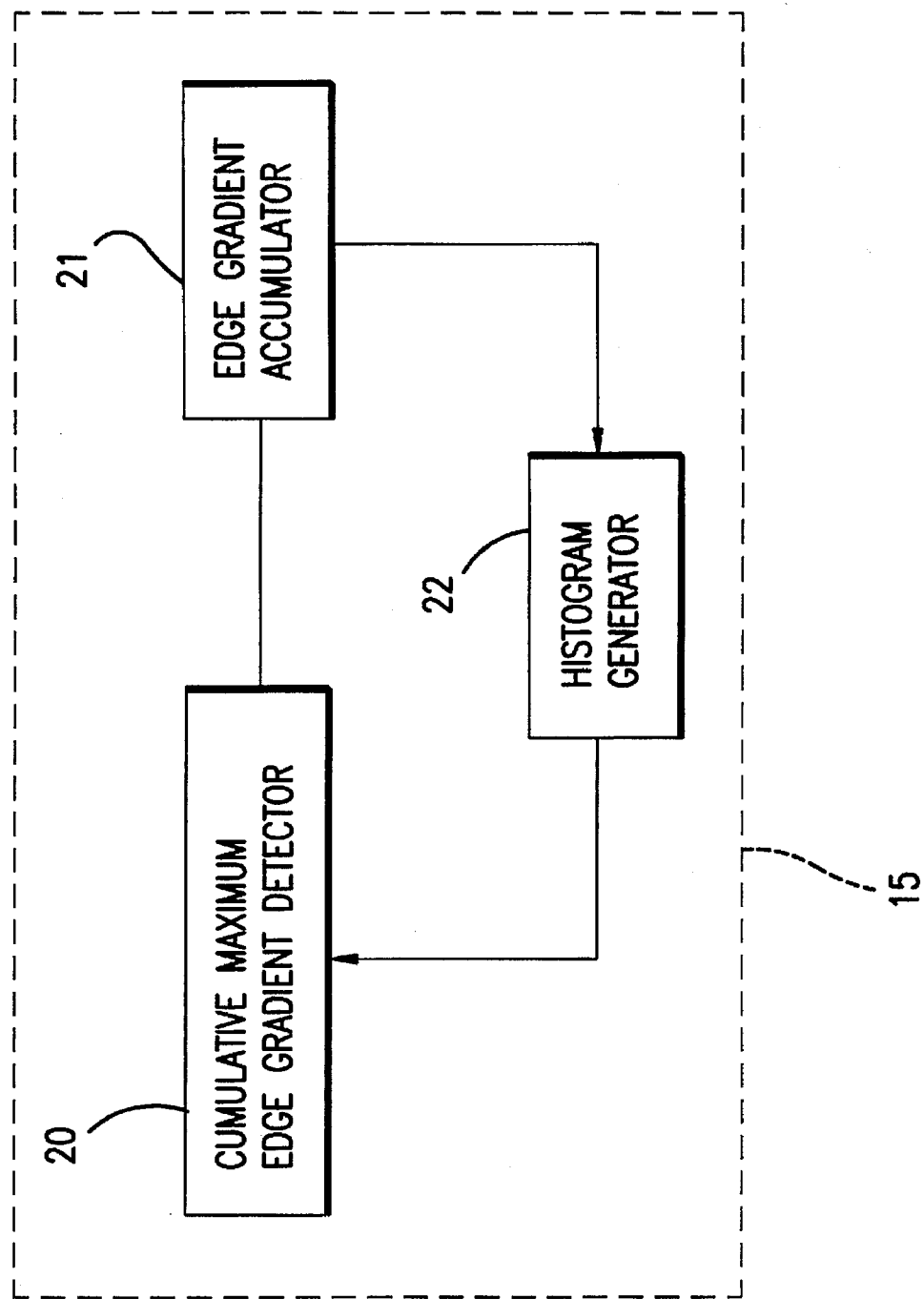
FIG. 25 is a block diagram of the anatomic feature detector shown in FIG. 24.

In a second embodiment of the invention according to the present invention, the anatomic feature detector 16 is constructed as shown in FIG. 25. The edge gradients are accumulated by edge gradient accumulator 21 and the histogram generator 22 forms histograms by plotting the maximum cumulative edge gradients as a function of their orientation. The cumulative maximum edge gradient is detected by cumulative maximum edge gradient detector 20. Using the cumulative maximum edge gradient data, anatomic feature edges are detected by anatomic feature edge detector 15. The output of the anatomic feature edge detector 15 is used by the anatomic feature representation producer 16 to produce a representation of the anatomic feature desired to be detected.

Figure 26:
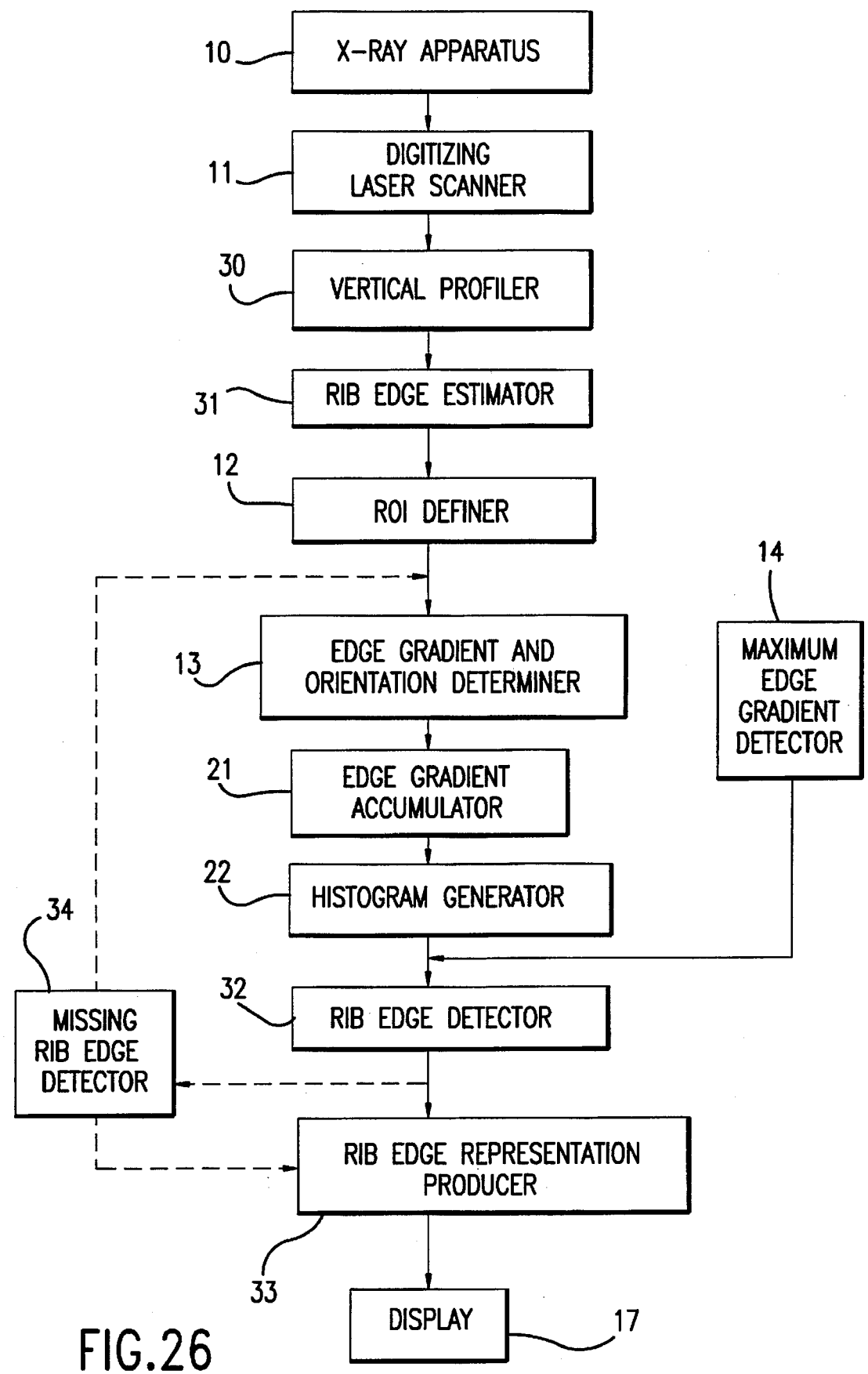
FIG. 26 is a block diagram of a second embodiment of the system according to the present invention for detection of rib edges.

A second embodiment of the system according to the present invention for the detection of ribs is shown in FIG. 26. This system additionally includes a vertical profiler 30 for defining vertical profiles in each lung in the chest radiograph, and a rib edge estimator 31 which fits a shift-variant sinusoidal function to the vertical profiles to obtain estimates of the rib edges. The remainder of the device functions similarly to the systems shown in FIGS. 24 and 25, with the anatomic feature edge detector 15 and the anatomic feature representation producer 15 respectively serving as a rib edge detector 32 and a rib edge representation producer 33. The embodiment may also include a missing rib estimator 34 for estimating ribs which are not detected initially. When using a missing rib edge detector 34, the rib edge representation producer 33 produces elliptical functions fitted to each rib edge. Thus, the missing rib edges may be estimated directly from the elliptical functions, or edge gradients may be redetermined in areas where a missing rib is estimated to be located by the missing rib edge estimator 34.

Figure 27:
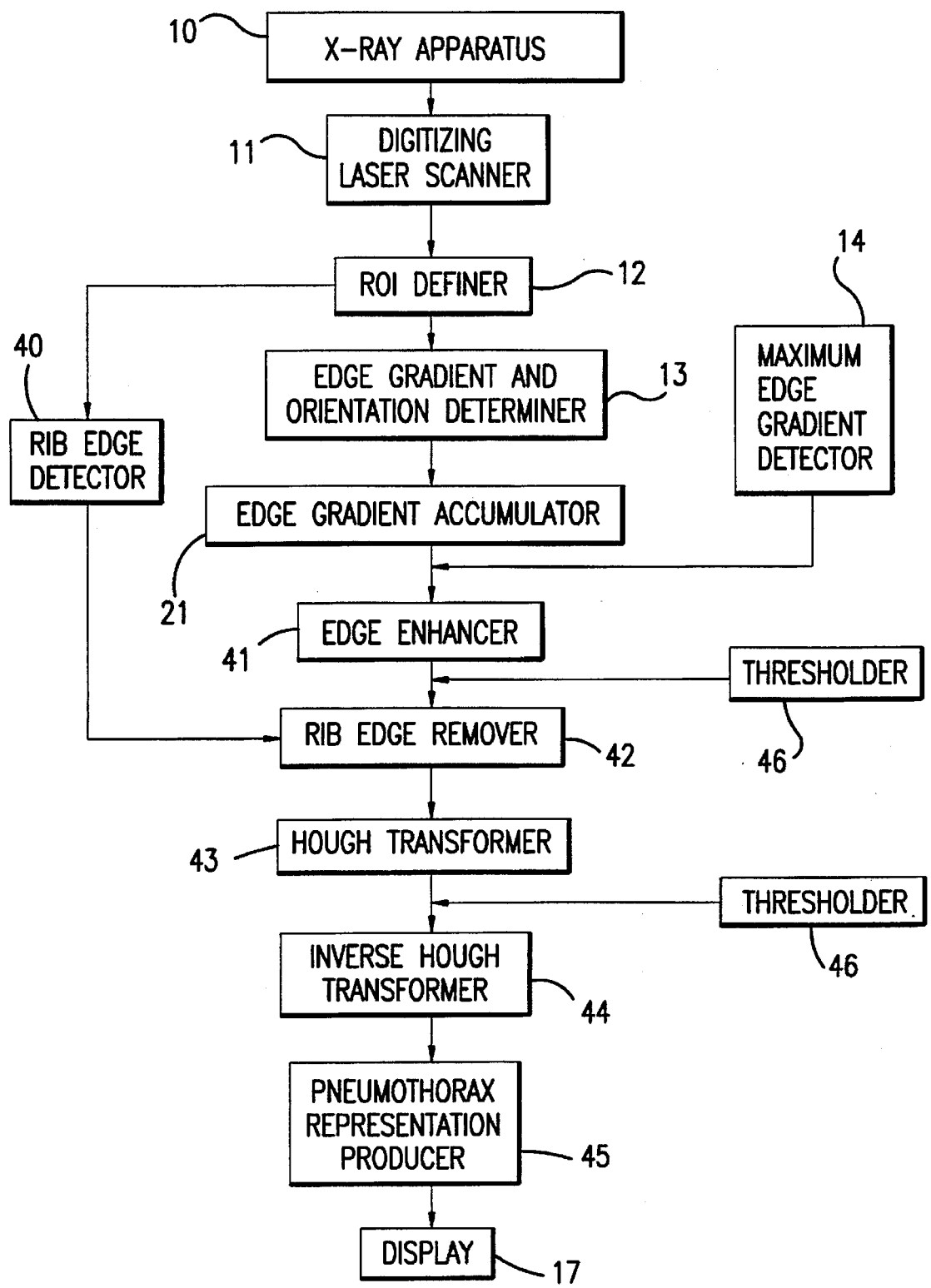
FIG. 27 is a block diagram of a third embodiment of the system according to the present invention for detection of pneumothorax.

FIG. 27 illustrates a further embodiment of the system according to the present invention used to detect pneumothorax. This embodiment includes a rib edge detector 40 which may include the structure shown in FIG. 25. Further, after edge gradients have been detected, the edge enhancer 41 enhances the ROI using these edge gradients. The rib edge remover 42 removes rib edges detected by rib edge detector 40 from the edge-enhanced ROI. A Hough transformer 43 uses a Hough transform to detect curved line structure in the edge-enhanced ROI having the rib edges removed. The inverse Hough transformer 44 applied to selected points in a strongly accumulated area formed by the Hough transform detects a pneumothorax pattern. The pneumothorax representation producer 45 produces a representation of the detected pneumothorax pattern which is displayed on display 17. This embodiment may also include thresholders 46 for removing image noise and components due to rib edges from the edge-enhanced ROI and the Hough transform parameter space.

The embodiments of the system shown in FIGS. 24–27 are preferably implemented in software and controlled via a computer, but it is also possible to implement these embodiments in a hardware system.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the U.S. is:

1. A method for the detection of a anatomic feature in a chest radiograph, comprising:

(a) defining plural regions of interest in said radiograph;

(b) determining edge gradients in at least one of said plural regions of interest and corresponding orientations of said edge gradients for each of a plurality of pixels included in said at least one of said regions of interest;

(c) determining a cumulative edge gradient of the edge gradients and corresponding orientations determined in said at least one of said plural regions of interest in step (b) by summing in said at least one of said plural regions of interest the edge gradients having the same orientation; and (d) detecting at least one edge of said anatomic feature based upon the cumulative edge gradient determined in said at least one of said plural regions of interest, comprising, (d1) determining which regions of interest in aid cumulative edge gradient have an orientation within a predetermined range of orientations; and (d2) determining a location of an edge of said anatomic feature based on locations of regions of interest which are determined in step (d1) to have said orientation within said predetermined range of orientations; and (e) producing a representation of said anatomic feature using said at least one detected edge.

2. A method as recited in claim 1, wherein said step (b) of determining said edge gradients comprises:

fitting said pixels in said regions of interest using a predetermined function;

subtracting said predetermined function from said pixels to obtain background-trend-corrected regions of interest; and determining said edge gradients using pixels in said background-trend-corrected regions of interest.

3. A system according to claim 1, wherein:

step (b) comprises determining edge gradients and corresponding orientations of said edge gradients for each of the plurality of pixels included in each of said plural regions of interest;

step (c) comprises determining a respective cumulative edge gradient for each of said plural regions of interest; and step (d1) comprises determining which of said cumulative edge gradients has a largest sum within said predetermined range of orientations; and step (d2) comprises determining said edge of said anatomic feature as a location of the region of interest having in its respective cumulative edge gradient said largest sum of orientations within said predetermined range of orientations.

4. A method as recited in claim 3, wherein rib edges are detected, a vertical direction in said chest radiograph is a direction generally parallel to a subject's spine and a horizontal direction is a direction perpendicular to said vertical direction, and said step (a) of defining regions of interest comprises:

determining vertical profiles in regions of both lungs of said chest radiograph;

fitting a predetermined model function to said vertical profiles to obtain initial estimates of said rib edges in said radiograph; and defining said regions of interest in said radiograph to include regions containing said initial estimates.

5. A method as recited in claim 4, further comprising:

determining a magnitude of each of said determined edge gradients in each of said regions of interest;

determining corresponding orientations of said magnitudes of said edge gradients in a polar coordinate system having r and θ as variables;

determining said cumulative edge gradients in each region of interest by summing said magnitudes of said edge gradients having the same edge gradient orientation in the respective region of interest; and forming histograms of said cumulative edge gradients and using said histograms to define upper and lower edges of a rib.

6. A method as recited in claim 5, wherein said step of defining said regions of interest comprises:

defining a plurality of said regions of interest in a vertical orientation with respect to said radiograph and with respect to each other; and overlapping each of said plurality of regions of interest by no more than half of an adjacent one of said plurality of regions of interest.

7. A method as recited in claim 4, wherein said step of producing a representation comprises:

fitting each of said detected rib edges with an elliptical function; and obtaining a representation of an entire rib structure using said rib edges fitted with said elliptical function.

8. A method as recited in claim 7, wherein said step of fitting each of said rib edges further comprises:

grouping detected rib edge points of a selected rib based upon orientation of said edge gradients of said selected rib for distinction of upper and lower edges of said selected rib, and upon vertical positions of said detected rib edge points of said selected rib as a function of horizontal position in said radiograph.

9. A method as recited in claim 7, further comprising:

estimating a set of fitting parameters for a missing of said detected rib edges to obtain an estimated rib edge based upon previously fitted rib edges; and reperforming said steps of defining regions of interest, determining edge gradients and detecting rib edges.

10. A system for the detection of an anatomic feature in a chest radiograph, comprising:

first means for defining regions of interest in said radiograph;

second means for determining edge gradients in said regions of interest and corresponding orientations of said edge gradients for each of a plurality of pixels included in each of said regions of interest;

third means for determining a respective cumulative edge gradient for each region of interest by summing in each region of interest the edge gradients having the same orientation;

fourth means for detecting at least one edge of said anatomic feature based upon the cumulative edge gradients determined in said plural regions of interest, comprising, means for determining which of said cumulative edge gradients has a largest sum within a predetermined range of orientations; and means for determining an edge of said anatomic region based on a location of the region of interest having in its respective cumulative edge gradient said largest sum within said predetermined range of orientations; and fifth means for producing a representation of said anatomic feature using said at least one detected edge.

11. A system as recited in claim 10, wherein said second means for determining edge gradients comprises:

means for fitting said pixels in said regions of interest using a predetermined function;

means for subtracting said predetermined function from said pixels to obtain background-trend-corrected regions of interest; and means for determining said edge gradients using pixels in said background-trend-corrected regions of interest.

12. A system as recited in claim 10, wherein said anatomic feature includes rib edges, a vertical direction in said chest radiograph is a direction generally parallel to the subject's spine and a horizontal direction is a direction perpendicular to said vertical direction, and said first means comprises:

means for determining vertical profiles in both lung regions of said chest radiograph;

means for fitting a predetermined model function to said vertical profiles to obtain initial estimates of said rib edges in said radiograph; and means for defining said regions of interest in said radiograph to include regions containing said initial estimates.

13. A system as recited in claim 12, wherein said fifth means comprises:

means for fitting each of said detected rib edges with an elliptical function; and means for obtaining a representation of entire ribs using said rib edges fitted with said elliptical function.

14. A system as recited in claim 12, wherein said third means comprises:

means for determining a magnitude of each of said determined edge gradients in each of said regions of interest;

means for plotting said magnitudes of said edge gradients and corresponding orientations of said magnitudes of said edge gradients in a polar coordinate system having r and $\theta$ as variables, wherein said magnitudes of said edge gradients are plotted as said r variable and said corresponding orientations of said edge gradient magnitudes are plotted as said $\theta$ variable;

summing means for summing in each region of interest the magnitudes of said edge gradients having the same orientation to produce said cumulative edge gradients; and means for forming histograms of said cumulative edge gradients and using said histograms to define upper and lower edges of a rib.

15. A system as recited in claim 14, wherein said first means for defining said regions of interest comprises:

means for defining a plurality of said regions of interest in a vertical orientation; and means for overlapping each of said plurality of regions of interest by no more than half of an adjacent of said plurality of regions of interest.

16. A system as recited in claim 13, wherein said means for fitting each of said rib edges further comprises:

means for grouping detected rib edge points of a selected rib based upon orientation of said edge gradients of said selected rib for distinction of upper and lower edges of said selected rib, and upon vertical positions of said detected rib edge points of said selected rib as a function of horizontal position in said radiograph.

17. A system as recited in claim 13, further comprising:

means for estimating a set of fitting parameters for a missing rib edge to obtain an estimated rib edge based upon previously fitted rib edges.

18. A method for detection of a pneumothorax in a chest radiograph, comprising:

detecting rib edges in said radiograph;

defining a pneumothorax region of interest in said radiograph which includes said pneumothorax;

removing said rib edges and respective areas adjacent said rib edges from said pneumothorax region of interest;

detecting a curved line in said pneumothorax region of interest having said rib edges removed; and producing a representation of said pneumothorax based on the detected curved line;

wherein said step of detecting rib edges comprises:

defining plural regions of interest in said radiograph which include regions containing rib edges;

determining edge gradients and corresponding orientations of the determined edge gradients for each of a plurality of pixels included in each of said regions of interest;

determining a respective cumulative edge gradient for each region of interest by summing in each region of interest the edge gradients of those pixels of the respective region of interest having the same orientation;

determining a rib edge based on the cumulative edge gradients determined in the preceding step, comprising, determining which of said cumulative edge gradients has a largest sum within a predetermined range of angles; and determining said rib edge based on a location of the region of interest having in its respective cumulative edge gradient said largest sum within said predetermined range of orientations.

19. A method as recited in claim 18, wherein a vertical direction in said chest radiograph is a direction generally parallel to a subject's spine and a horizontal direction is a direction perpendicular to said vertical direction, and said step of defining said pneumothorax region of interest comprises:

determining vertical profiles in regions of both lungs of said chest radiograph;

fitting a predetermined model function to said vertical profiles to obtain initial estimates of said rib edges in said radiograph; and defining first regions of interest in said radiograph which include regions containing said initial estimates.

20. A method as recited in claim 18, wherein said step of removing said rib edges comprises:

fitting said detected rib edges with a predetermined function providing a rib edge curve for each of said detected rib edges; and removing from said pneumothorax region of interest first pixels corresponding to said rib edge curves and a predetermined number of second pixels surrounding each of said first pixels on each of said rib edge curves.

21. A method as recited in claim 18, further comprising:

edge enhancing said pneumothorax region of interest by determining edge gradients and corresponding orientations for each pixel in said pneumothorax region of interest and assigning data values to pixels having edge gradients at predetermined orientations and exceeding predetermined thresholds;

defining islands in said edge-enhanced pneumothorax region of interest;

determining a maximum magnitude of said edge gradients and a sum of magnitudes of said edge gradients in each island in said edge-enhanced pneumothorax region of interest;

eliminating first islands having a sum of magnitudes of said edge gradients below a first predetermined value in said edge-enhanced pneumothorax region of interest; and eliminating second islands having a maximum of magnitudes of said edge gradients above a second predetermined value in said edge-enhanced pneumothorax region of interest.

22. A method as recited in claim 21, wherein:

said step of eliminating said first islands comprises removing noise components from said edge-enhanced pneumothorax region of interest; and said step of eliminating said second islands comprises removing remaining rib edge components from said edge-enhanced pneumothorax region of interest.

23. A method as recited in claim 18, wherein said step of detecting said curved line comprises:

using a Hough transform to detect said curved line corresponding to said pneumothorax;

obtaining a strongly accumulated area having accumulated values in a r–$\theta$ parameter space using said Hough transform; and detecting said pneumothorax by applying an inverse Hough transform to selected points in said strongly accumulated area in said r–$\theta$ parameter space.

24. A method as recited in claim 23, further comprising:

eliminating in said strongly accumulated values a first portion of said accumulated values below a first predetermined threshold; and eliminating in said strongly accumulated area a second portion of said accumulated values above a second predetermined threshold.

25. A system as recited in claim 24, wherein:

said step of eliminating said first portion of said accumulated values comprises removing noise components from said strongly accumulated area; and said step of eliminating said second portion of said accumulated values comprises removing rib edge components from said strongly accumulated area.

26. A system for detection of a pneumothorax in a chest radiograph, comprising:

means for defining rib edge regions of interest and a pneumothorax region of interest;

first means for detecting rib edges in said rib edge regions of interest in said radiograph;

second means for removing said rib edges and respective adjacent areas from said pneumothorax region of interest;

third means for detecting a curved line in said enhanced pneumothorax region of interest having said rib edges removed; and fourth means for producing representation of said pneumothorax based on the detected curve line;

wherein said first means comprises:

means for determining edge gradients and corresponding orientations of the determined edge gradients for each of a plurality of pixels included in each of said rib edge regions of interest;

means for determining a respective cumulative edge gradient for each rib edge region of interest by summing the edge gradients of pixels of the respective rib edge region of interest which have the same orientation;

means for determining a rib edge based on said respective cumulative edge gradients, comprising, means for determining which of said respective cumulative edge gradients has a greatest sum within a predetermined range of orientations, and means for determining said rib edge based on a location of the region of interest having in its respective cumulative edge gradient said largest sum in said predetermined range of orientations.

27. A system as recited in claim 26, wherein a vertical direction in said chest radiograph is a direction generally parallel to a subject's spine, a horizontal direction is a direction perpendicular to said vertical direction, and said means for defining regions of interest comprises:

means for determining vertical profiles in both lung regions of said chest radiograph;

means for fitting a predetermined model function to said vertical profiles to obtain initial estimates of said rib edges in said radiograph; and means for defining said regions of interest in said radiograph as regions containing said initial estimates.

28. A system as recited in claim 26, wherein said second means for removing said rib edges comprises:

means for fitting said detected rib edges with a predetermined function providing a rib edge curve for each of said detected rib edges; and means for removing from said pneumothorax region of interest first pixels corresponding to said rib edge curves and a predetermined number of second pixels surrounding each of said first pixels on each of said rib edge curves.

29. A system as recited in claim 26, further comprising:

means for edge enhancing said pneumothorax region of interest by determining edge gradients and corresponding orientations for each pixel in said pneumothorax region of interest and assigning data values to those pixels having edge gradients at predetermined orientations and exceeding predetermined thresholds;

means for defining islands in said edge-enhanced pneumothorax region of interest;

means for determining a maximum magnitude of said edge gradients and a sum of magnitudes of said edge gradients in each island in said edge-enhanced pneumothorax region of interest;

means for eliminating first islands having a sum of magnitudes of said edge gradients below a first predetermined value in said edge-enhanced pneumothorax region of interest; and means for eliminating second islands having a maximum of magnitudes of said edge gradients above a second predetermined value in said edge-enhanced pneumothorax region of interest.

30. A system as recited in claim 29, wherein:

said means for eliminating said first islands comprises means for removing noise components from said edge-enhanced pneumothorax region of interest; and said means for eliminating said second islands comprises means for removing remaining rib edge components from said edge-enhanced pneumothorax region of interest.

31. A system as recited in claim 26, wherein said third means comprises:

means for using a Hough transform to detect said curved line corresponding to said pneumothorax;

means for obtaining a strongly accumulated area having accumulated values in a r–θ parameter space using said Hough transform; and means for detecting said pneumothorax by applying an inverse Hough transform to selected points in said strongly accumulated area in said r–θ parameter space.

32. A system as recited in claim 31, further comprising:

means for eliminating a first portion of said accumulated values in said strongly accumulated area below a first predetermined threshold; and means for eliminating a second portion of said accumulated values in said strongly accumulated area above a second predetermined threshold.

33. A system as recited in claim 32, wherein:

said means for eliminating said first portion of said accumulated values comprises means for removing noise components from said strongly accumulated area; and said means for eliminating said second portion of said accumulated values comprises means for removing rib edge components from said strongly accumulated area.

* * * * *